United States Patent
Bernard et al.

(10) Patent No.: US 11,448,783 B2
(45) Date of Patent: *Sep. 20, 2022

(54) DOCKING STATION FOR WIRELESS SEISMIC ACQUISITION NODES

(71) Applicant: SERCEL, Carquefou (FR)

(72) Inventors: Cyrille Bernard, Saint-Philibert de Grand-Lieu (FR); Mathieu Sanche, Nort sur Erdre (FR)

(73) Assignee: SERCEL, Carquefou (FR)

(*) Notice: Subject to any disclaimer, the term of this patent is extended or adjusted under 35 U.S.C. 154(b) by 0 days.

This patent is subject to a terminal disclaimer.

(21) Appl. No.: 17/238,393

(22) Filed: Apr. 23, 2021

(65) Prior Publication Data

US 2021/0239867 A1 Aug. 5, 2021

Related U.S. Application Data

(63) Continuation of application No. 16/569,855, filed on Sep. 13, 2019, now Pat. No. 11,022,708.

(51) Int. Cl.
*G06F 1/16* (2006.01)
*G01V 1/16* (2006.01)
(Continued)

(52) U.S. Cl.
CPC ................ *G01V 1/164* (2013.01); *G01V 1/22* (2013.01); *G06F 1/1632* (2013.01); *G06F 13/10* (2013.01);
(Continued)

(58) Field of Classification Search
CPC .... G01V 1/76; G01V 1/22; G06F 1/16; G06F 13/10; G06F 13/38; H01R 13/518; H01R 33/06; H01R 33/90; H02J 7/00
See application file for complete search history.

(56) References Cited

U.S. PATENT DOCUMENTS 5,253,223 A 10/1993 Svenning et al.
7,195,505 B1 3/2007 Becker
(Continued)

FOREIGN PATENT DOCUMENTS

CA 3075873 A1 3/2019
CN 101944694 A 1/2011
(Continued)

OTHER PUBLICATIONS

Invitation to Pay Additional Fees with Partial Search Report dated Jan. 12, 2021 in related/corresponding PCT Application No. PCT/IB2020/000762.

(Continued)

*Primary Examiner* — Steven G Snyder
*Assistant Examiner* — Christopher A Daley
(74) *Attorney, Agent, or Firm* — Patent Portfolio Builders PLLC

(57) ABSTRACT

A docking station for receiving different types of seismic nodes, the docking station including a frame; a control module attached to the frame plural docking modules attached to the frame, wherein each docking module includes plural docking bays; a monitor attached to the frame and configured to display information about the plural docking modules; and a network connection device attached to the frame and configured to provide data transfer capabilities for each docking bay of the plural docking bays. The plural docking bays are configured to accept interchangeable ports that are compatible with the different types of seismic nodes.

20 Claims, 28 Drawing Sheets

(51) Int. Cl.
*G01V 1/22* (2006.01)
*G06F 13/10* (2006.01)
*G06F 13/38* (2006.01)
*H01R 13/518* (2006.01)
*H01R 33/06* (2006.01)
*H01R 33/90* (2006.01)
*H02J 7/00* (2006.01)

(52) U.S. Cl.
CPC ........... *G06F 13/38* (2013.01); *H01R 13/518* (2013.01); *H01R 33/06* (2013.01); *H01R 33/90* (2013.01); *H02J 7/0013* (2013.01); *H02J 7/0027* (2013.01); *H02J 7/0045* (2013.01); *G06F 2213/40* (2013.01)

(56) References Cited

U.S. PATENT DOCUMENTS

| | | | |
|---|---|---|---|
| 7,668,044 | B2 | 2/2010 | Brinkman et al. |
| 7,725,264 | B2 | 5/2010 | Pavel et al. |
| 8,547,796 | B2 | 10/2013 | Wilcox et al. |
| 2005/0134003 | A1 | 6/2005 | Bryde et al. |
| 2005/0246137 | A1 | 11/2005 | Brinkman et al. |
| 2005/0276162 | A1 | 12/2005 | Brinkmann et al. |
| 2009/0086797 | A1 | 4/2009 | Wilcox |
| 2009/0093687 | A1 | 4/2009 | Telfort et al. |
| 2012/0008460 | A1 | 1/2012 | Crice |
| 2013/0300266 | A1 | 11/2013 | Ramey et al. |
| 2013/0336092 | A1 | 12/2013 | Pennec et al. |
| 2014/0126327 | A1 | 5/2014 | Swier et al. |
| 2014/0126329 | A1 | 5/2014 | Guyton et al. |
| 2014/0219051 | A1 | 8/2014 | Pavel |
| 2014/0379129 | A1 | 12/2014 | Edsinger et al. |
| 2015/0171793 | A1 | 6/2015 | Regier |
| 2015/0355610 | A1 | 12/2015 | Petrocy et al. |
| 2016/0011324 | A1 | 1/2016 | Hamon et al. |
| 2016/0224057 | A1 | 8/2016 | Ecker et al. |
| 2017/0299740 | A1 | 10/2017 | Guyton et al. |
| 2018/0341033 | A1 | 11/2018 | Olivier et al. |
| 2020/0241156 | A1 | 7/2020 | Contant et al. |
| 2020/0318462 | A1 | 10/2020 | Ross et al. |
| 2021/0063483 | A1 | 3/2021 | Hermann |
| 2021/0080599 | A1 | 3/2021 | Gregoire et al. |
| 2021/0080603 | A1 | 3/2021 | Dabouineau et al. |

FOREIGN PATENT DOCUMENTS

| | | |
|---|---|---|
| EP | 1995609 A1 | 11/2008 |
| EP | 2677346 A1 | 12/2013 |
| FR | 2981212 B1 | 11/2013 |
| WO | 2013015795 A1 | 1/2013 |
| WO | 2021048630 A1 | 3/2021 |

OTHER PUBLICATIONS

PCT International Search Report and Written Opinion of the International Searching Authority (Forms PCT/ISA/220, PCT/ISA/210 and PCT/ISA/237) for corresponding/related International Application No. PCT/IB2020/000763 dated Jan. 13, 2021.

PCT International Search Report and Written Opinion of the International Searching Authority (Forms PCT/ISA/220, PCT/ISA/210 and PCT/ISA/237) for corresponding/related International Application No. PCT/IB2020/000775 dated Jan. 18, 2021.

PCT International Search Report and Written Opinion of the International Searching Authority (Forms PCT/ISA/220, PCT/ISA/210 and PCT/ISA/237) for corresponding/related International Application No. PCT/IB2020/000762 dated Mar. 22, 2021.

U.S. Office Action for related U.S. Appl. No. 16/569,855 dated Feb. 6, 2020.

Office Action in related/corresponding U.S. Appl. No. 16/569,846 dated Jul. 8, 2022.

DOCKING STATION FOR WIRELESS SEISMIC ACQUISITION NODES

BACKGROUND

Technical Field

Embodiments of the subject matter disclosed herein generally relate to a docking station that is configured to receive plural wireless seismic acquisition nodes for testing, power recharge, and data download, and more particularly, to a docking station that has docking bays with interchangeable plugs for accommodating different types of wireless seismic acquisition nodes.

Discussion of the Background

Land seismic data acquisition and processing generate a profile (image) of a geophysical structure under the earth's surface, which is known as the subsurface. While this profile does not provide an accurate location of oil and gas reservoirs, it suggests, to those trained in the field, the presence or absence of these reservoirs. Thus, providing a high-resolution image of geophysical structures under the surface is an ongoing process.

Reflection seismology is a method of geophysical exploration to determine the properties of earth's subsurface, which is especially helpful in the oil and gas industry. Land reflection seismology is based on using a controlled source of energy that sends the energy into the earth. By measuring the time it takes for the reflections to come back to plural receivers, distributed over an area of interest, it is possible to evaluate the depth of features causing such reflections. These features may be associated with subterranean hydrocarbon deposits.

One system for recording the reflections of the seismic waves off the geological structures present in the subsurface makes use of plural seismic nodes. The seismic nodes are capable of providing good data because of their wide-azimuth geometry. Wide-azimuth coverage is helpful for imaging beneath complex overburdens such as those associated with salt bodies. The seismic nodes can also provide multi-component data.

For a given seismic survey 100, as shown in FIG. 1, hundreds if not thousands of wireless seismic nodes 110 are distributed over an area 120 of interest for recording seismic signals. The wireless seismic nodes 110 can be placed according to a given orderly pattern over the area 120, or in any other way. The wireless seismic nodes 110 are configured to exchange data between them, in an ad-hoc network. In one implementation, the wireless seismic nodes 110 communicate with a general controller 130 and can receive instructions or commands from this controller. In another implementation, a harvester 140 having its own antenna 142 and processing capabilities 144 can move about each node and collect the stored seismic data. Each seismic node 110 includes dedicated electronics that is housed inside the node, and at least one antenna 112 that extends outside the housing. The recording of the seismic signals can be implemented in various ways, for example, in short periods of time repeated over a long period of time, or continuously over a long period of time. Regardless of the method selected for recording the seismic data, the wireless seismic nodes have a limited amount of electrical power for functioning and also a limited amount of memory for recording the seismic data. The electrical power constraints are further exacerbated by the need of the nodes to communicate among themselves for various reasons, which are not of interest here, and/or with a harvester device that might pass the area of interest for collecting the stored seismic data, and/or with one or more servers. In one embodiment, the wireless seismic nodes are configured to receive GPS signals for providing a time stamp to the recorded data and/or also for obtaining the geographical coordinates of the node. All these acts use up the limited electrical energy stored by each node and eventually the battery of the node gets depleted and need to be recharged.

When a wireless seismic node runs low on power, it needs intervention from the operator of the seismic survey. Typically, for such situations, the operator of the seismic survey either collects all the seismic nodes and takes them to a maintenance facility for recharging them, or the operator drives a vehicle equipped with a power source, connects this power source to each seismic node, and recharges their batteries. U.S. Pat. No. 7,668,044, the entire content of which is incorporated herein by reference, discloses a system that is configured to receive plural identical wireless seismic nodes for battery recharging and data downloading, as illustrated in FIG. 2, which corresponds to FIG. 1H of this reference. The system 200 includes plural charging modules 193, which are connected to corresponding ports 190. The seismic nodes are attached to the ports 190 for recharging. A flow of the recharging energy may be regulated by a power breaker 191. The system 200 also includes power supplies 187 for each charging module 193. Data flows from the charging modules 193 to a host computer 183. FIG. 2 also shows a data-reduction computer 140, that is connected to the host computer 183, and is configured to implement an analysis of the received data.

However, there are some problems with such a system for the following reasons. As shown in FIGS. 1D and 1E of this reference (not reproduced herein), a handle and an antenna of the seismic node need to be removed prior to placing the seismic node into the recharging system, which is shown in FIG. 1F of this reference (not reproduced herein). The operations of removing the antenna and the handle of each seismic node for thousands of seismic node is by itself a cumbersome and time consuming process, which is undesired. In addition, this reference discloses a single type of seismic nodes being recharged with the system shown in FIG. 1F. As some seismic acquisition systems include more than one type of wireless seismic nodes, which are configured to have different components and different plugs for connecting to the recharging system, the system proposed by this reference is limited only to those seismic acquisition systems that use a single type of seismic nodes. If another type of seismic node is used, the system in this reference cannot handle this problem.

Thus, there is a need for a system that can quickly receive plural seismic nodes, without the need to assembly/disassembly any part of the node. In addition, there is a need for a system that can receive different types of seismic nodes.

BRIEF SUMMARY OF THE INVENTION

According to an embodiment, there is a docking station for receiving different types of seismic nodes. The docking station includes a frame, a control module attached to the frame, plural docking modules attached to the frame, wherein each docking module includes plural docking bays, a monitor attached to the frame and configured to display information about the plural docking modules, and a network connection device attached to the frame and configured to provide data transfer capabilities for each docking bay of the plural docking bays. The plural docking bays are configured to accept interchangeable ports that are compatible with the different types of seismic nodes.

According to another embodiment, there is a docking station configured to receive different types of seismic nodes. The docking station includes a control module, plural docking modules, each docking module including plural docking bays, and a network connection device configured to provide data transfer capabilities for each docking bay of the plural docking bays. The plural docking bays are configured to accept interchangeable ports that are compatible with the different types of seismic nodes.

BRIEF DESCRIPTION OF THE DRAWINGS

For a more complete understanding of the present invention, reference is now made to the following descriptions taken in conjunction with the accompanying drawings, in which:

FIG. 12A illustrate the docking station configured to receive analog seismic nodes while

DETAILED DESCRIPTION OF THE INVENTION

Figure 1:
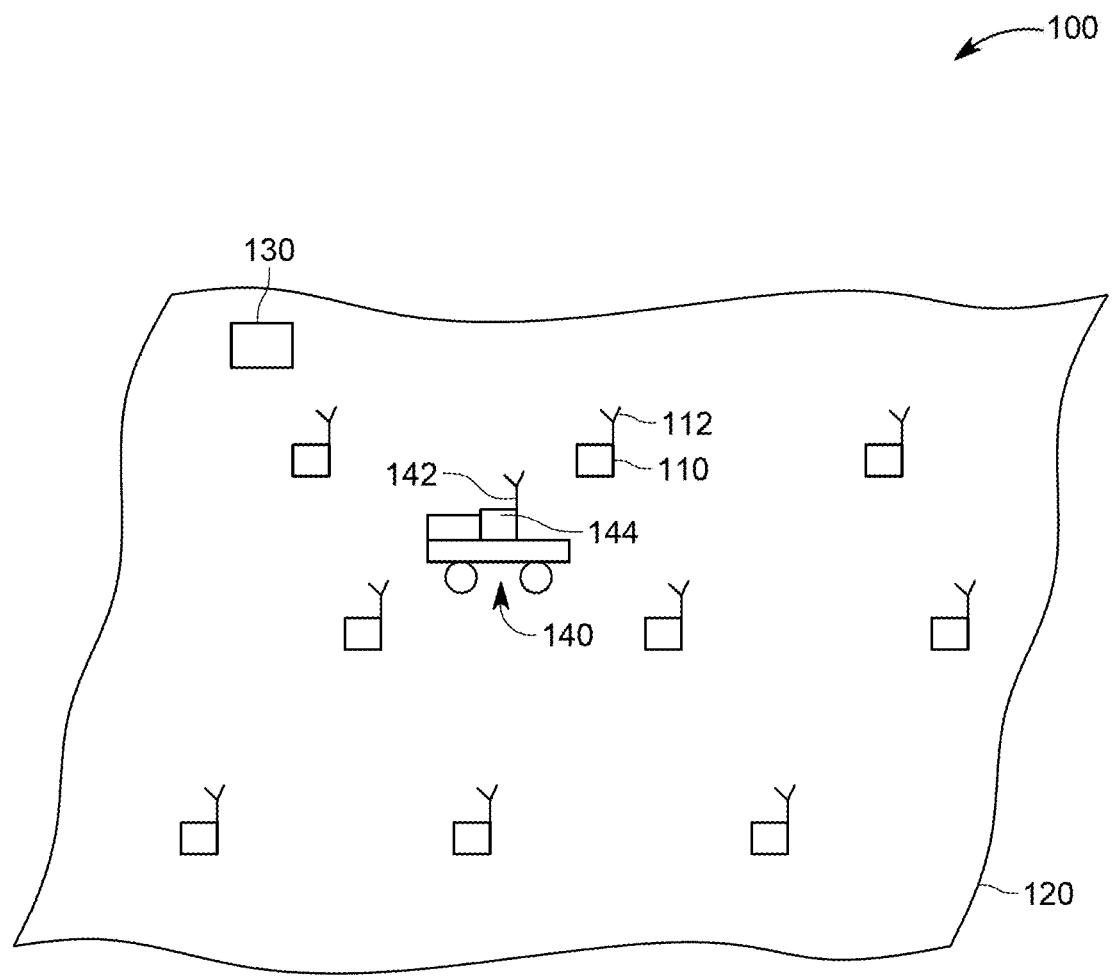
FIG. 1 illustrates a land seismic acquisition system that uses wireless seismic nodes for collecting seismic data.
Figure 2:
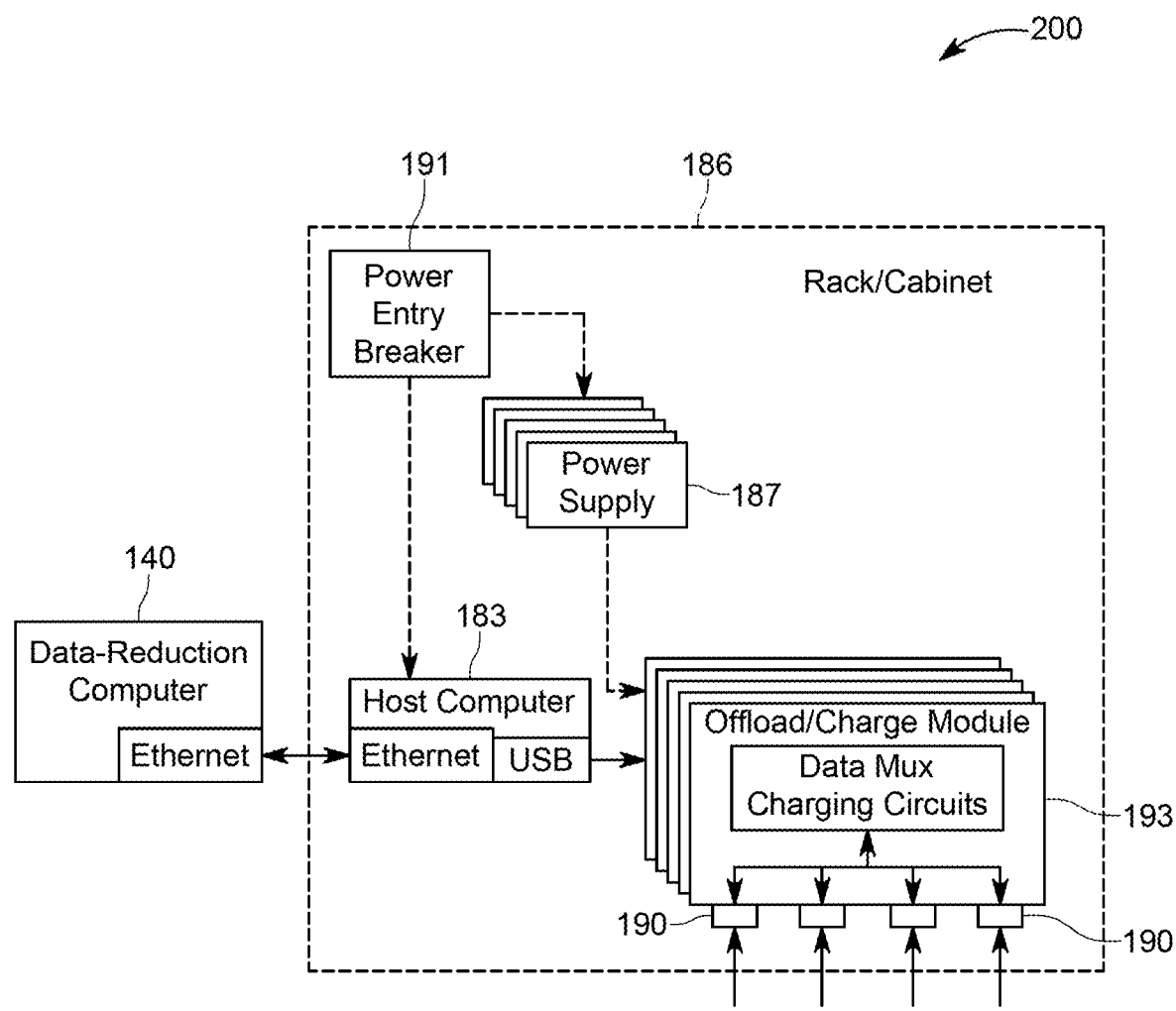
FIG. 2 illustrates a recharging system for recharging the seismic nodes and transferring seismic data.

The following description of the embodiments refers to the accompanying drawings. The same reference numbers in different drawings identify the same or similar elements. The following detailed description does not limit the invention. Instead, the scope of the invention is defined by the appended claims. The following embodiments are discussed, for simplicity, with regard to a docking station that can reconfigured to selectively receive plural wireless seismic nodes, of two different types, for testing the nodes, recharging their batteries, and/or downloading their seismic data. However, the embodiments to be discussed next are not limited to a docking station that can be selectively reconfigured to receive and process only two types of seismic nodes, but the docking station may be configured to simultaneously receive and process the two different types of seismic nodes, or to receive and process other types of seismic nodes, in addition to the two types.

Reference throughout the specification to "one embodiment" or "an embodiment" means that a particular feature, structure or characteristic described in connection with an embodiment is included in at least one embodiment of the subject matter disclosed. Thus, the appearance of the phrases "in one embodiment" or "in an embodiment" in various places throughout the specification is not necessarily referring to the same embodiment. Further, the particular features, structures or characteristics may be combined in any suitable manner in one or more embodiments.

According to an embodiment, a docking station integrates plural docking bays that can be reconfigured for accepting different types of seismic nodes. Each docking bay has a docking port, which is configured to establish electrical contact with a corresponding wireless, autonomous, seismic node. The docking port can be quickly removed from the docking bay and another docking port, which is appropriate for another seismic node, may be attached to the docking bay for mating with this another seismic node. In one application, each docking port includes two electrical contacts on one side, for mating with the appropriate seismic node, and a same electrical connection for connecting to a docking module of the docking station. The electrical connection is configured to slide in and out of the docking module while the docking port may be attached with screws to the docking module. The docking bay has an engagement mechanism for mechanically connecting to the seismic node so that the established electrical connection between the docking port of the docking bay and the seismic node is maintained. No assembly or disassembly of the seismic node is involved in the docking or undocking process. In other words, no physical access to the interior of the seismic node is required for recharging the battery and/or downloading the seismic data from the seismic node. The docking bay is configured to not only electrically recharge a battery of the seismic node, but also to harvest the seismic data from the seismic node, test the seismic node, update the firmware of the seismic node, or reconfigure the software of the seismic node. A single, integrated, control unit of the docking station is configured to achieve all these functions with one docking operation. Details of the docking station are now discussed with regard to the figures.

Figure 3:
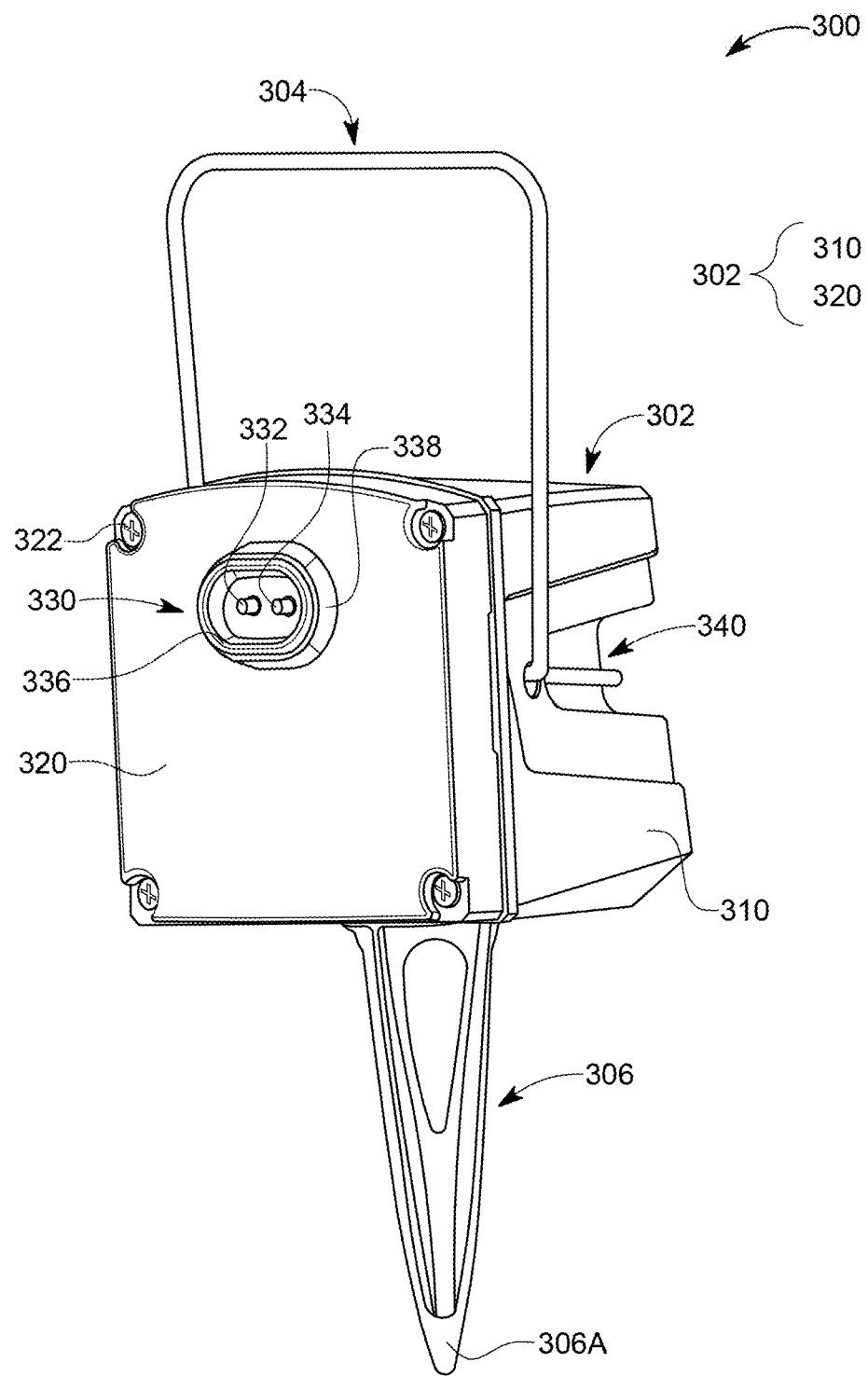
FIG. 3 illustrates an autonomous, wireless, digital seismic node for collecting seismic data.

Before discussing details of the novel docking station, a brief discussion of two types of wireless, autonomous, seismic nodes is believed to be in order. A wireless, autonomous, digital field unit (DFU) 300, or digital node is shown in FIG. 3. This seismic node is configured to use a transceiver and antenna for communications (no wires), i.e., wireless, and also to operate independent of a general control unit of the entire seismic survey, i.e., autonomous. The digital node 300 has a housing 302, a handle 304 (for example, a piece of rope) attached to the housing 302, and a spike 306 removably attached to the housing 302. The handle 304 is optional and is configured to provide the operator of the node with a means for carrying the digital node. The spike 306 is configured to have a sharp tip 306A for penetrating the ground, for achieving a good contact between the ground and the seismic sensor (for example, MEMS sensor) located inside the housing.

The housing 302 is made of two components, a base 310 and a cover 320. The cover 320 is attached to the base 310 so that the housing 302 forms a sealed, inside chamber 312 (to be discussed later). Note that the chamber 312 is formed inside the base 310 and has an open side 312'. The cover 320, when attached to the base 310, is configured to close the open side 312' and to seal the chamber 312. The cover 320 can be attached in various ways to the base 310. The embodiment illustrated in FIG. 3 shows the cover being attached with screws 322 to the base 310. Any type of screws may be used. In this embodiment, four screws are used. However, those skilled in the art would understand that more or less screws may be used. Note that the handle 304 is attached to the base 310 and not to the cover 320 as the same base is used for other types of sensors, as discussed later. Also, the spike 306 is attached to the base. The cover 320 has in this embodiment only one element, an external connection plug 330, which is discussed in more detail later, and is configured to mate with a corresponding docking port of a docking bay of the docking station. The external connection plug 330 has first and second pins 332 and 334 for electrical connection to the docking port. The first and second pins 332 and 334 are surrounded by a protective skirt 336, which is configured not only to absorb shocks, but also to prevent water entering the chamber 312. In addition, the cover 320 has a rigid belt 338 formed around the protective skirt 336 to prevent any accidental impact to the pins 332 and 334.

The base 302 is shaped as a box with a trench type depression 340 formed around three sides of the box. The depression 340 is shaped to conform to the human hand so that the operator of the node can easily handle the node. This feature also suggest a size of the base 310 (less than 20 cm) for fitting the hand of the operator. In this way, the node is easy to handle.

Figure 4A:
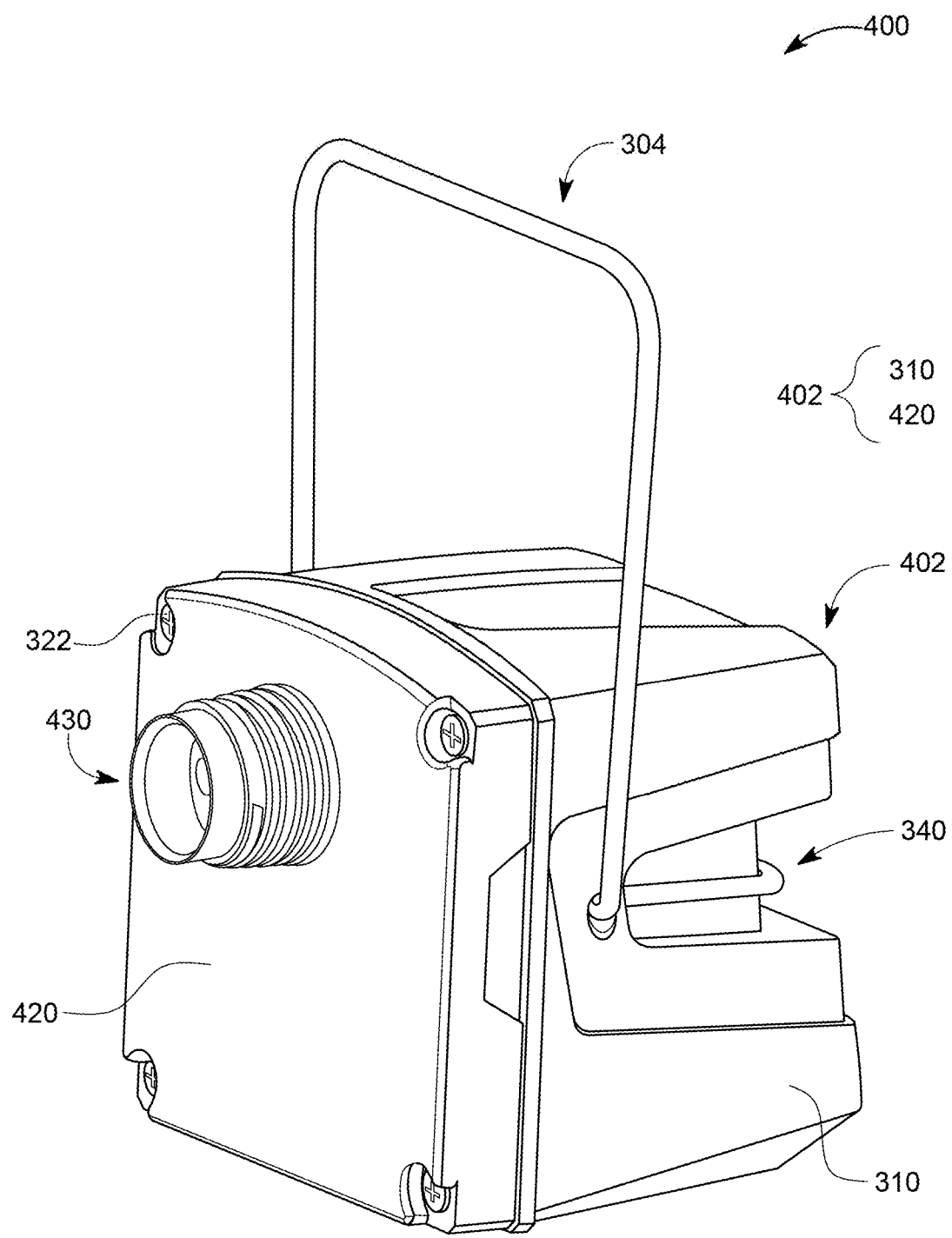
FIGS. 4A and 4B illustrate an autonomous, wireless, analog seismic node for collecting seismic data.
Figure 4B:
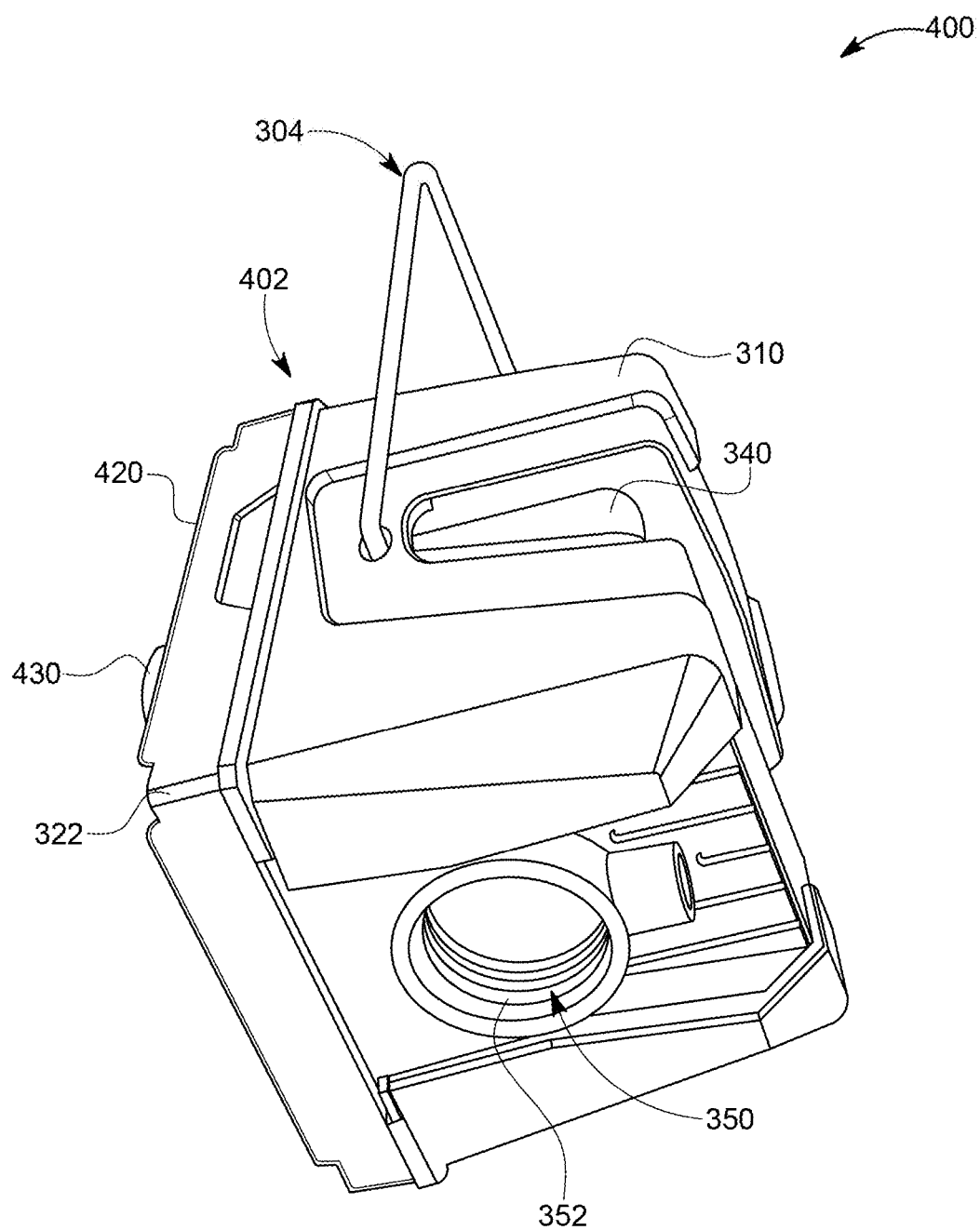

FIG. 4A shows a wireless, autonomous, analog field unit (AFU) node 400, or analog node herein, that shares the same base 310 as the DFU node 302. Thus, the AFU node 400 has a housing 402 that includes the base 310 and another cover 420. The handle 304 is the same handle as for the DFU node 302. The base 310 has the same depression 340 for easy handling by the operator. The cover 420 is attached with the same screws 322 to the base 310 as for the DFU node 302. However, the external connection plug 430 for the AFU node is different than the external connection plug 330 of the DFU node for reasons to be discussed later. FIG. 4B shows that the housing 402 has a receiving unit 350 formed into the base 302, and this receiving unit is configured to receive the spike 306. The receiving unit 350 may have threads 352 that match corresponding threads on the spike 306, so that the spike 306 can be removed as needed. For the ADU unit 400, no spike is need and thus, FIGS. 4A and 4B illustrate the housing 402 without the spike 306. Thus, the spike 306 may be added or removed from the base 310 on a need basis.

Figure 5:
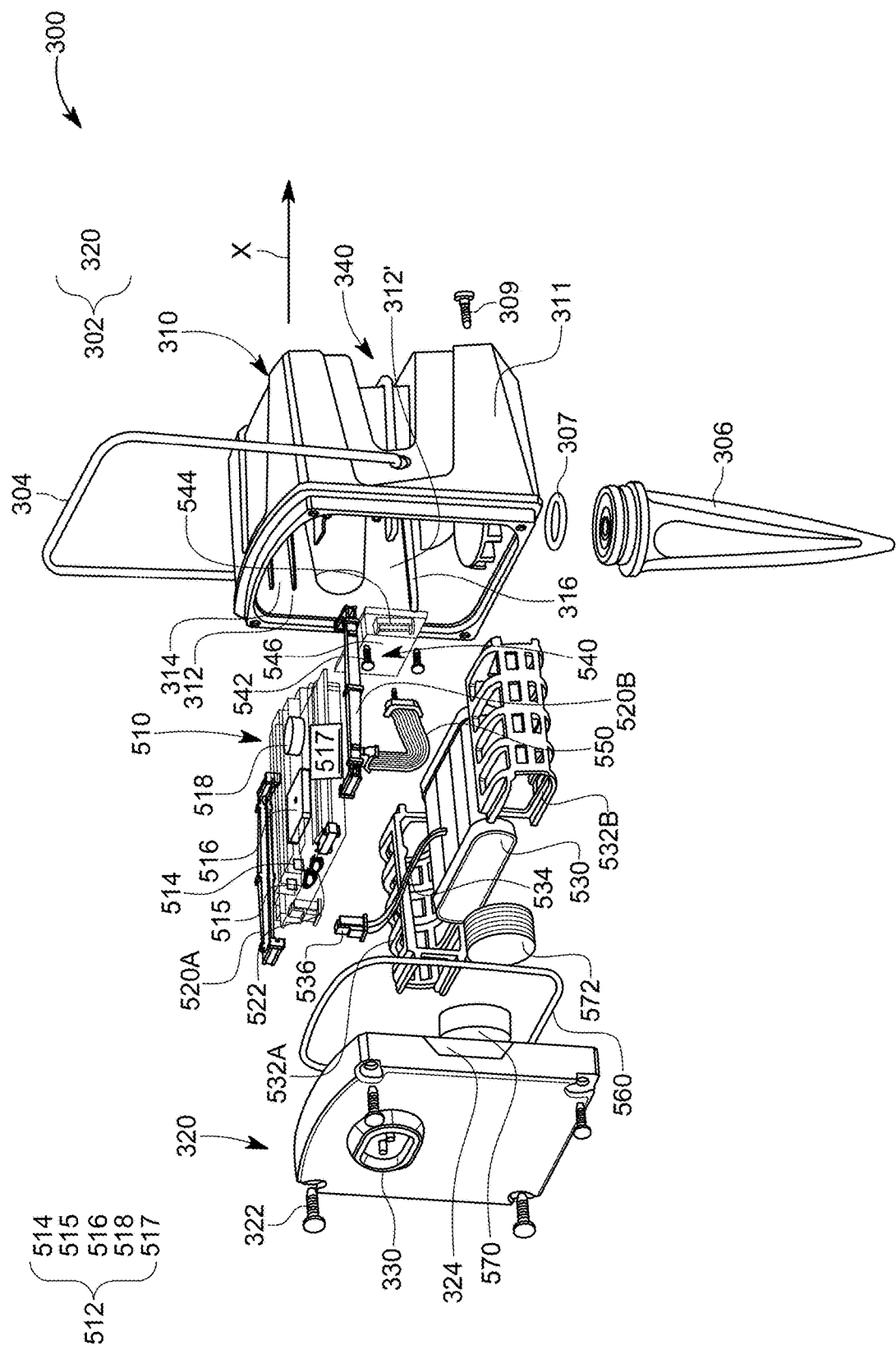
FIG. 5 is an exploded view of the autonomous, wireless, digital seismic node.

FIG. 5 shows an exploded view of the inside of the housing 302 of a node 300 and also of the various electronic and non-electronic components that are stored by the base 310. Regarding the inside of the base 310, it is noted that it defines the chamber 312, which is open through only one face 312', which is configured to be fully covered by the cover 320, when attached to the base 310. Inside the chamber 312, there are first guides 314 that extend linearly along a first direction X, as shown in the figure. The first guides 314 may be made of the same material as the base 310, or of a different material. In one embodiment, both the first guides 314 and the base 310 are made of plastic or composite material. However, in another embodiment, they are made of metal.

The chamber 312 may also include second guides 316, that might extend parallel to the first guides 313. Both the first and second guides extend along opposite sides (or faces) of the base 310 and they are configured to guide various elements into the base. For example, the first guides 314 are configured to guide a main electronic board 510 into the chamber 312 while the second guides 316 are configured to guide a battery pack 530 into the chamber 312. The main electronic board 510 includes a printed circuit board on which one or more electrical components 512 are added. The electrical components 512 may include an integrated circuit 514, which acts as a controller, a memory device 515 (for example, a removable SD card or any other equivalent storage device) that is configured to store the collected seismic data, a single antenna 516, a transceiver 517, and a GPS module 518. Other electronic devices may be included as necessary. The antenna 516 is connected to the transceiver 517, which is configured to establish wireless communication with a harvester device, and/or with adjacent nodes, and/or with a global control unit, while the GPS module 518 receives GPS signals that may include a time stamp and location information. In one application, the digital node 300 includes a single transceiver and a single antenna for communicating with other nodes and also with the harvester device. The processor 514 may coordinate one or more of the functions of the node 300 as will be discussed later.

The entire main electronic board 510 may be attached to dedicated shock absorbers or damper elements 520A and 520B and this assembly is inserted along the first guides 314 into the chamber 312. Thus, the damper elements 520A and 520B directly contact the first guides. The damper elements are made of a damping material, i.e., a material that is absorbs kinetic energy caused by shocks and transforms it into other forms of energy, for example, heat. An example of such a material is rubber or a soft plastic or a composite. Each damper element may be implemented as a beam that is fixed at its ends, but the rest of the beam is allowed to oscillated to damp the shocks. The purpose of the damper elements is to absorb any kinetic energy that may be transmitted otherwise to the main electronic board, for example, if the node is falling on the ground, or from internal vibrations induced by the transport of the node, so that the electronics on the main electronic board is not damaged. In this way, there is no hard point contact between the main electronic board and the base. The damper elements have a second purpose, which is related to the alignment of the main electronic board to the external connection plug 330, which is discussed later.

Figure 6:
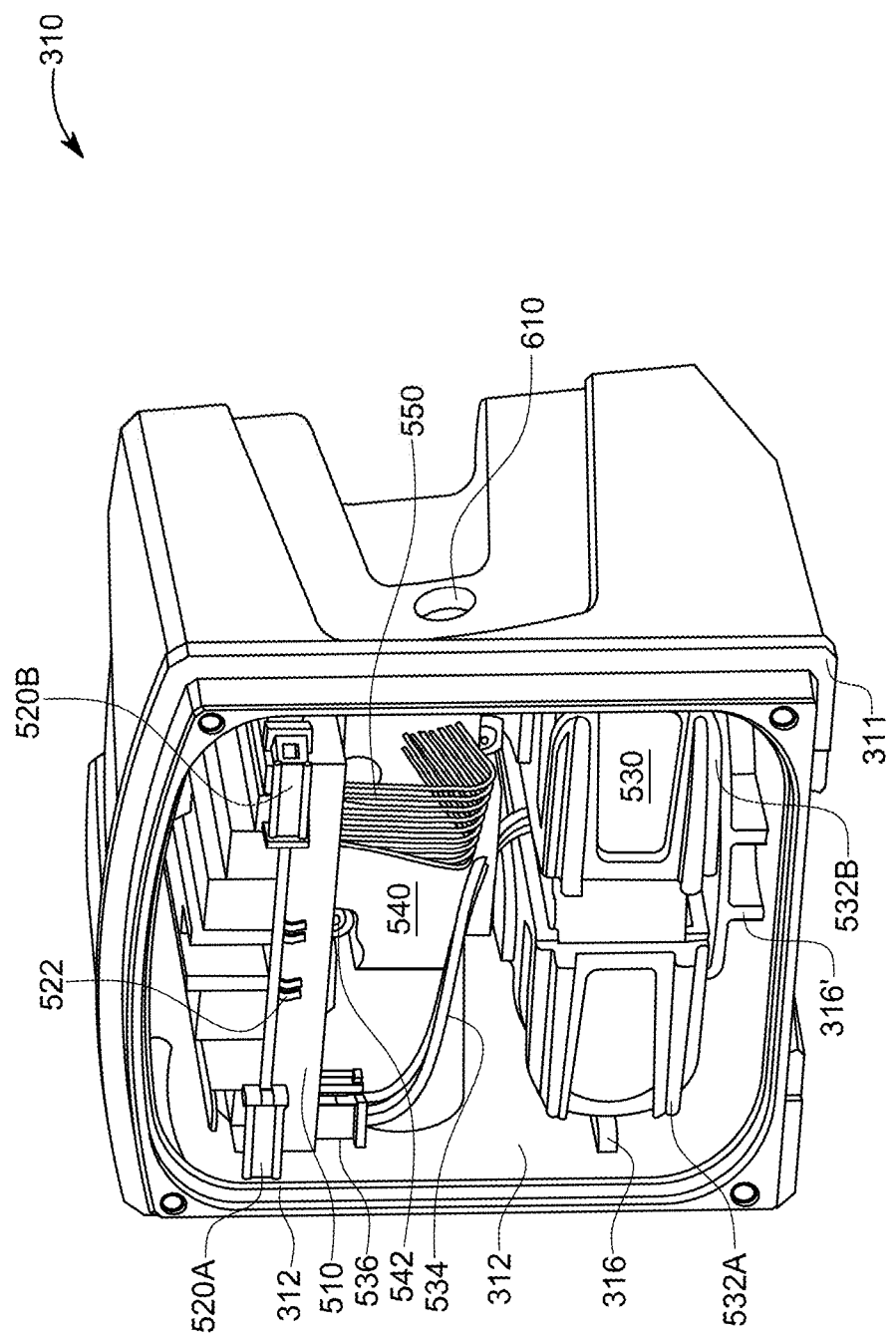
FIG. 6 illustrates a base and various components housed by the base of the autonomous, wireless, digital seismic node.

FIG. 6 shows only the base 310 and the main electronic board 510 and the battery pack 530 attached to their guides, inside the chamber 312. Note that the battery pack 530 is much smaller than the previous batteries that have been used for seismic nodes. For example, a typical battery previously used for seismic nodes included 10 cells while the battery pack 530 may include only 4 cells. This is so because the main electronic board 510 has been optimized to include less electronic components and/or low consumption processing elements. Also, the processor 514 is a low-power microcontroller and the power efficiency of all the electronic components is improved. In addition, the use of only one transceiver to perform (1) multi-hop routing with the other nodes and (2) local data exchange with a harvesting device (i.e., long- and mid-range operations) also require less energy. All these factors combined permit the DFU node 300 or the AFU node 400 to use a smaller battery than the existing seismic nodes.

FIG. 6 further shows that the main electronic board 510 has two or more connecting strips 522 located on a side, so that they will automatically engage with corresponding electrical connectors of the external connection plug 330 when the cover 320 is attached to the base 310. FIG. 6 also shows that the second guide 316 may include an additional guide 316', which is configured to support the weight of the battery pack 530. This additional guide 316' provides a rigid bottom tray that is configured to withstand a crash of the node with the ground, and also to ensure a good coupling. Its rigidity may be used to eliminate vibratory modes. The additional guide 316' may be configured together with the second guide 316 to ensure that the battery pack 530 clamps or snaps into place, with no need for additional fastening devices. Also visible in FIG. 6, there is a hole 610 formed in a side of the base 310. This hole may serve for attaching a rope or wire so that the entire node 300 can be easily transported when deployed in the field.

Returning to FIG. 5, the battery pack 530 has its own dampers 532A and 532B, which are attached to the battery pack, and these dampers engage the second guides 316, as shown in FIG. 6, for fixing the battery pack to the interior of the base 310. The dampers 532A and 532B not only protect the battery 530 against various unwanted shocks (e.g., the fall of the node on the ground) and internal vibrations induced during transportation, but also allow for an expansion of the size of the battery pack due to the charging/discharging process and/or temperature. Both FIGS. 5 and 6 shows an electrical connection 534 that electrically connects the battery pack 530 to the main electronic board 510, for supplying power. In the embodiment illustrated in FIGS. 5 and 6, the electrical connection 534 is fixedly attached to the battery pack 530 and removably connected with a connecting head 536 to the main electronic board 510. Note that by placing the battery pack 530 to the bottom of the base 310, due to the location of the second guide 316 under the first guide 314, the center of gravity of the entire node is lowered, which is desirable as this makes the node more stable and less prone to fall toward the ground when the spike 306 is not fully embedded into the ground.

FIG. 5 further shows a sensor device 540 that is configured to be attached with screws 542 to the base 310. FIG. 6 shows the sensor device 540 directly attached to the wall of the base 310. This is so because the sensor 544, which is attached to a board 546 of the sensor device 540, needs to detect any particle motion related parameter for recording it. Note that in this embodiment, the board 546 includes an analog-to-digital converter for transforming the analog signals recorded by the sensor 544 into digital signals. Thus, the signals that are sent by the sensor device 540 to the main electronic board 510 are digital signals. For this reason, the sensor device 540 is also called herein a digital sensor device. The particles of the ground in which the spike 306 is placed vibrate due to the generated seismic waves. These vibrations of the particles propagate through the spike and the base to the sensor device 540. In order to record these particle vibrations, a good coupling between the sensor 544 and the base 310 is necessary. The sensor 544 is configured to detect at least one of a displacement, speed or acceleration of the particles. In one embodiment, the sensor 544 is a microelectromechanical system (MEMS) that is configured to determine an acceleration along a single axis, or three mutually perpendicular axes. Any other kind of sensor may be used for determining a parameter related to the vibration of the particles. The sensor device 540 is electrically connected to the main electronic board 510 with an electrical connection 550, as also shown in FIG. 6. The electrical connection 550 is fixedly attached in this embodiment to the main electronic board and removably attached to the sensor device. Thus, when this assembly is modified as discussed later to make an AFU unit, the sensor device 540 is removed and the electrical connection 550 is not attached to anything. In one embodiment, if the electrical connection 550 is made to be removably attached to the main electronic board, then the electrical connection can also be removed for the AFU unit.

FIG. 5 also shows a seal 560 that is placed between the cover 320 and the base 310 for sealing the chamber 312. In addition, FIG. 5 shows that the node 300 may optionally include a desiccant material 570, which is attached to the cover 310, and a radio-frequency identification (RFID) tag 572, also attached to the cover 310. The desiccant material 570 is used to absorb the humidity from inside the chamber 312 while the RFID tag 572 provides a unique ID for the node so that it is easy to identify which node was placed where. Note that during a land seismic survey, it is possible to have hundreds if not thousands of nodes placed over the area of interest and keeping track of all these nodes is a considerable job. By having each node tagged with an RFID that has a unique ID makes the job of identifying the nodes easier.

FIG. 5 further shows that the spike 306 may be used with a seal collar 307 to be attached to the exterior of the base 310. To prevent the spike 306 from detaching from the base 310, it is possible to fix the spike 306 with a screw 309 to the receiving unit 350 (see FIG. 3). In addition, FIGS. 5 and 6 show that a soft molding protection cover 311 may be placed over parts of the base 310 to further prevent any unwanted kinetic energy to be transmitted to the node due to falls, to protect the electronic components. In one embodiment, the ends of the soft molding protection cover 311 may be over-molded, as shown in FIG. 6, to further enhance this protection.

FIG. 5 further shows that the cover 320 may have indentations or slots 324 formed on opposite sides so that the node can be attached to a docking bay from a docking station, which is discussed later, and held in place for recharging the battery and transferring the data.

Figure 7:
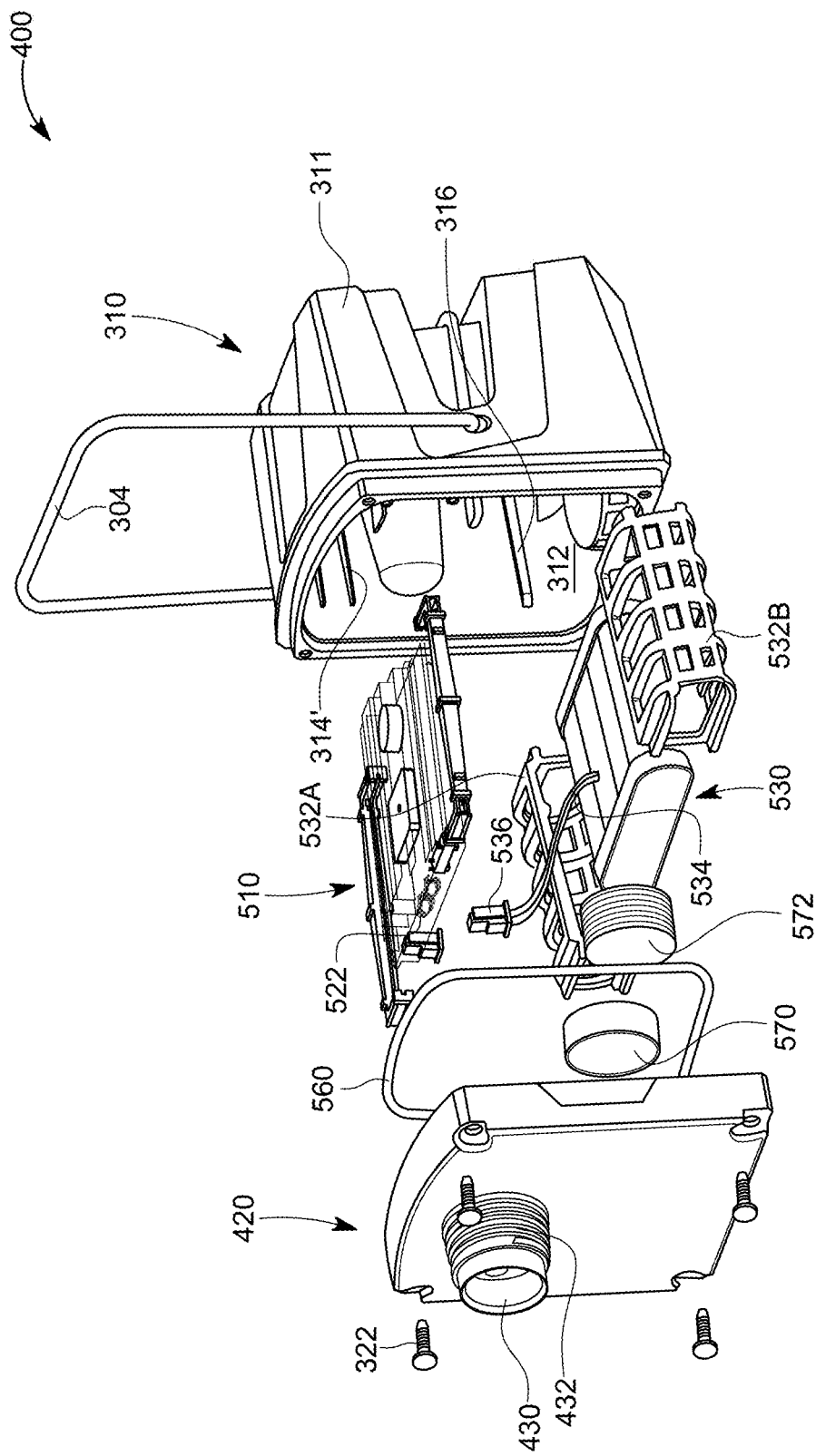
FIG. 7 is an exploded view of the autonomous, wireless, analog seismic node.

As previously discussed, the base 310 can be used not only for the DFU node 300, but also for the AFU node 400 shown in FIGS. 4A and 4B. In other words, the same base 310 can be used for different types of nodes, i.e., the base is interchangeable for these nodes. For the AFU node 400, as illustrated in FIG. 7, the base 310 has exactly the same configuration as the base 310 for the DFU node 300. Even more, the electronics that is placed inside the base 310 is almost similar to that of the DFU node 300. More specifically, FIG. 7 shows that the same main electronic board 510 and battery pack 530 are inserted with their dampers into the guides formed into the base. For the AFU node, the sensor device 540 is not present, as a different sensor is attached to this node. Thus, the sensor device 540 and its electrical connection 550 are omitted in the AFU node 400. In one embodiment, everything else shown in FIG. 5, except the cover 320, the sensor device 540, and the electrical connection 550, is present in the embodiment illustrated in FIG. 7. Thus, all those common components are not discussed herein again.

Figure 8:
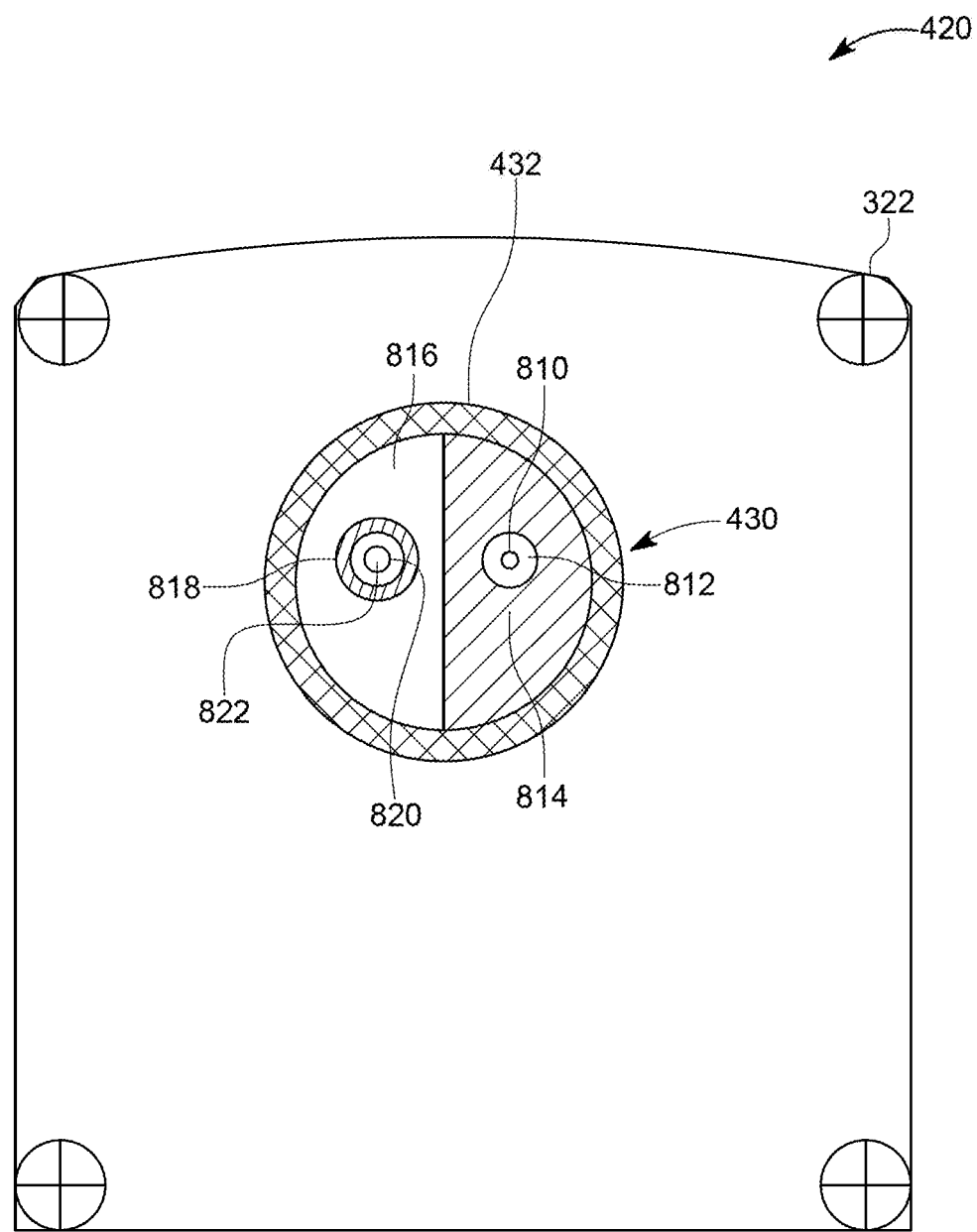
FIG. 8 illustrates a cover of the autonomous, wireless, analog seismic node.

The cover 420 is different from the cover 320 of the DFU unit 300 in terms of its external connection plug 330. The cover 420 has a different external connection plug 430 that is configured to be attached with threads 432 to one or more external sensors (not shown), for example, geophones. The external connection plug 430 is shown in more detail in FIG. 8 and includes a pin 810 that is placed in a hole 812 formed in a half-body portion 814 of the connection plug 430. The half-body portion 814 of the connection plug occupies only half of the connection plug. The other half is a depression portion 816 from which a tubular part 818 raises to the same level as the half-body portion 814. A hole 820 with a tubular metal contact 822 is formed inside the tubular part 818 for receiving a pin from an external sensor (discussed later).

Figure 9A:
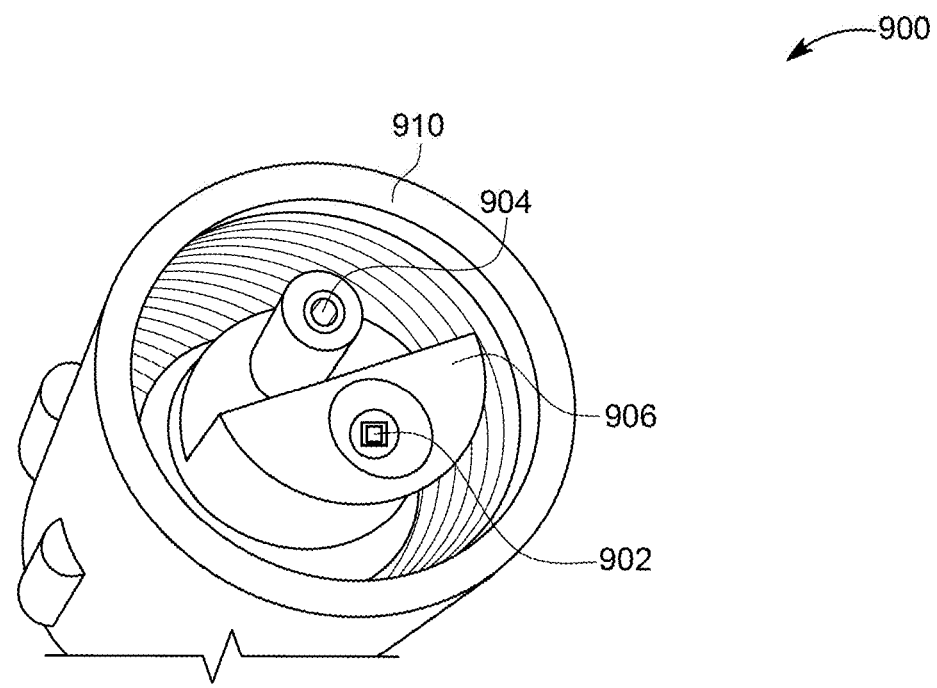
FIGS. 9A and 9B illustrate a connection device for the autonomous, wireless, analog seismic node.
Figure 9B:
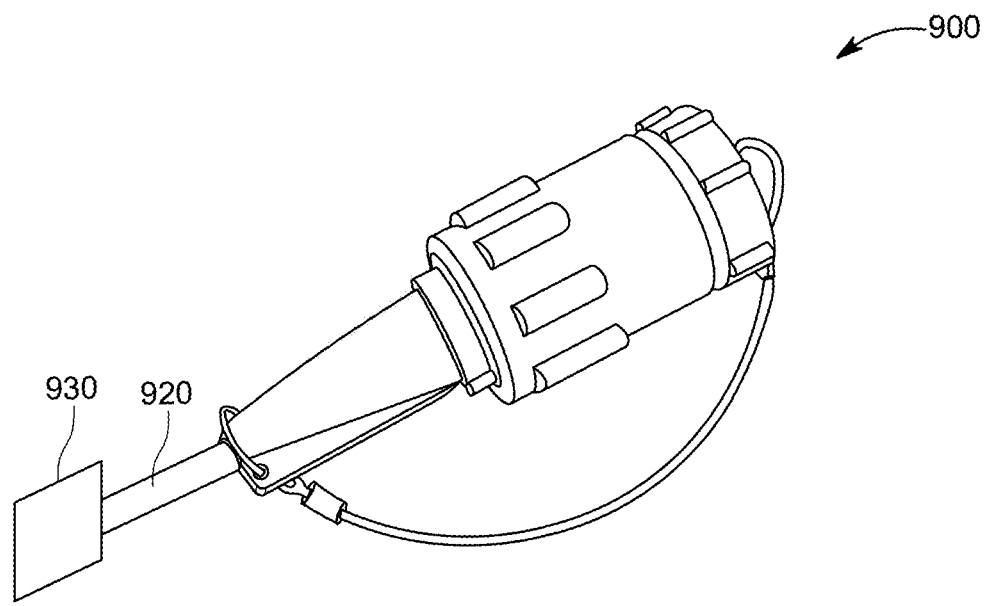

A connecting mechanism 900 that mates with the connection plug 430 is shown in FIGS. 9A and 9B. In one application, the connecting mechanism 900 is attached to the external sensor. FIG. 9A shows the connecting mechanism 900 having a metallic pin 902 and a metallic tubular member 904 that are configured to mate with the tubular metal contact 822 and the pin 810, respectively. The body 906 of the connecting mechanism 900 is configured to have a raised half portion and a lower half portion, to mate with the corresponding lower and raised half-body portions 916 and 914, respectively, of the connection plug 430. A sleeve 910 is attached to the connecting mechanism 900 and is configured to engage by threads, the corresponding threads 432 formed on the exterior surface of the connection plug 430. FIG. 9B shows the connecting mechanism 900 also having a cable 920 that transports information and/or electrical power from the pin/tubular members to the sensors 930 attached to the cable. In this regard, FIG. 9B shows the connecting mechanism 900 and a sensor 930 (e.g., a geophone), which is attached to the cable 920 of the connecting mechanism 900. While FIG. 9B shows only a single sensor 930 attached to the cable 920, it is possible to have plural sensors attached to this cable. In yet another embodiment, it is possible to attach the external sensor(s) 930 to the connection plug 430 through a connecting mechanism which is similar to the connecting mechanism 900, but does not have the sleeve 910. The external sensor 930 records analog data, which is transmitted as such to the main electronic board 510. For this reason, the seismic node 400 is an analog field unit. Those skilled in the art would understand that while FIGS. 9A and 9B describe a KCK2 type connector, other connectors may be used as long as the connecting mechanism and the connection plug on the cover of the node are configured to match each other. The choice of the KCK2 type connector in these figures is justified because the legacy sensors 930 in the industry have already this type of connection, and thus, it is desired that the novel node 400 is backward compatible with the existing sensors. However, this historical reason would not prevent that other types of connections may be implemented with the AFU node 400.

Figure 10:
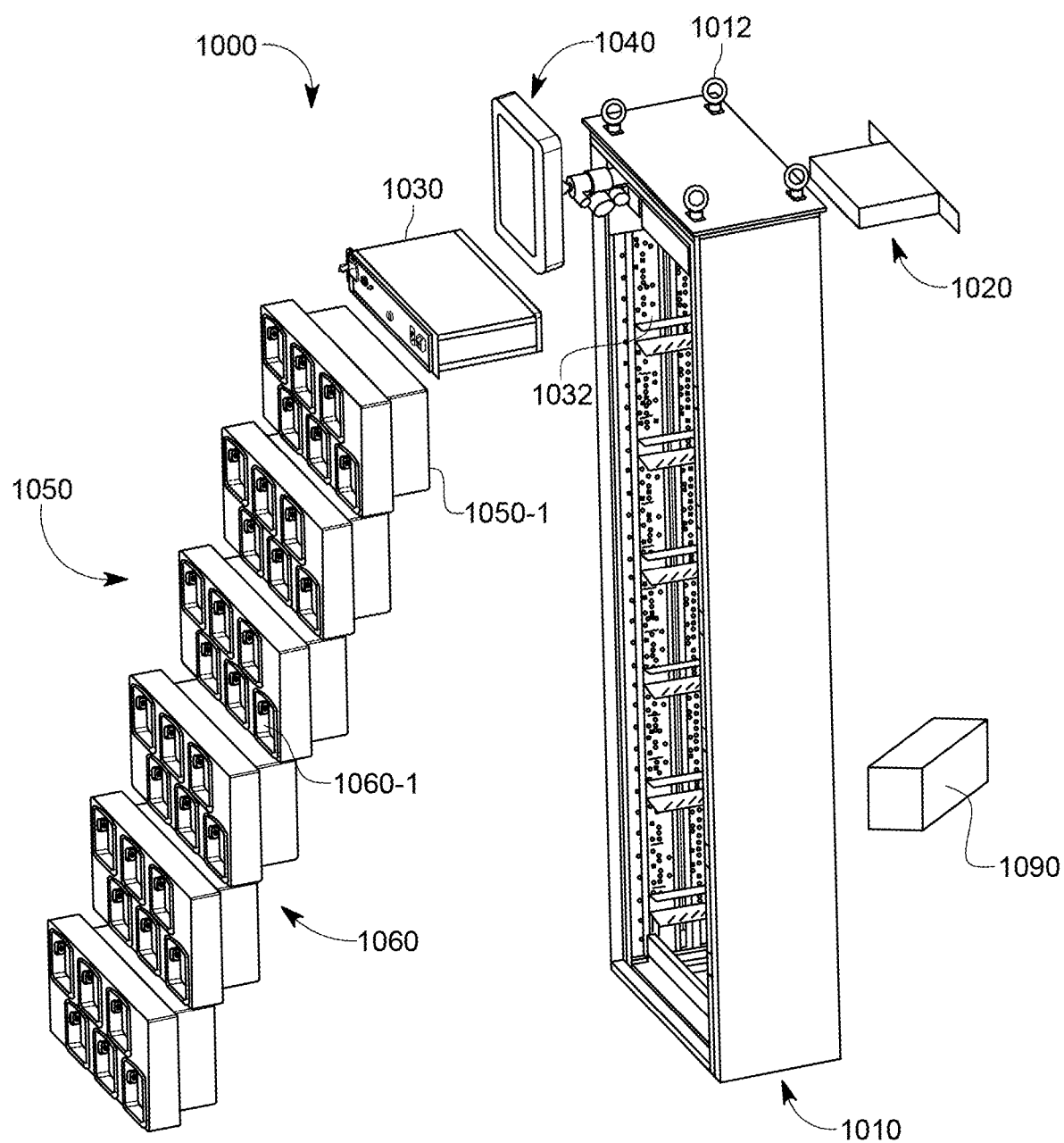
FIG. 10 illustrates a docking station that is reconfigurable for receiving different types of seismic nodes.

From the descriptions of the DFU node 300 and the AFU node 400 above, it is noted that regardless of the sensor type that needs to be deployed for a land seismic survey, the same base 310 is used. The unique and common base 310 of these different types of seismic nodes is exploited by the docking station 1000 (also called docking rack) illustrated in FIG. 10, by being able to connect and process different types of seismic nodes. The docking station 1000, which is shown in FIG. 10 as an exploded view, includes a frame 1010 that is configured to hold all the other components. The frame 1010 may be shaped as a cabinet that can stand by itself on a floor. The frame may be attached with screws (not shown) to a wall for safety. In one embodiment, the frame 1010 has one or more hooks 1012 so that it can be transported with a crane at a desired location. The frame may be made from plastic, composite, or metal.

FIG. 10 further shows that the docking station 1000 includes a network connection device 1020 that may include various electronic components for connecting the docking station to the internet or to a communication network, private or public. For example, in one embodiment, the network connection device 1020 includes an ethernet switch for connection to the internet. In another embodiment, the network connection device 1020 may include a router, a satellite communication device, a base station connected to a wireless phone network, or any other device for connecting to the communication network. If the privacy of the data is of concern, then the network connection device 1020 may include encoding mechanisms (software and/or hardware) for encoding the data. The network connection device 1020 may also be configured to connect only to a private network that is run by the operator of the docking station 1000. In one embodiment, the network connection device 1020 is connected to a server 1090. Note that the server 1090 may be located inside the docking station, in a vicinity of the docking station, or remotely located from the docking station.

Internally, the network connection device 1020 is connected to a harvester-charger module (HCM) 1030, which acts as the brain of the docking station 1000, and for this reason it is also called a control module. The internal structure of the HCM module 1030 is discussed later in more detail. In one embodiment, the HCM module 1030 is configured to slide along a dedicated rail 1032 into the frame 1010. In another embodiment, the HCM module 1030 is attached with screws to the frame 1010. In still another embodiment, the HCM module 1030 is configured to slide along the rail 1032 and then to be attached with screws to the frame 1010.

Figure 11A:
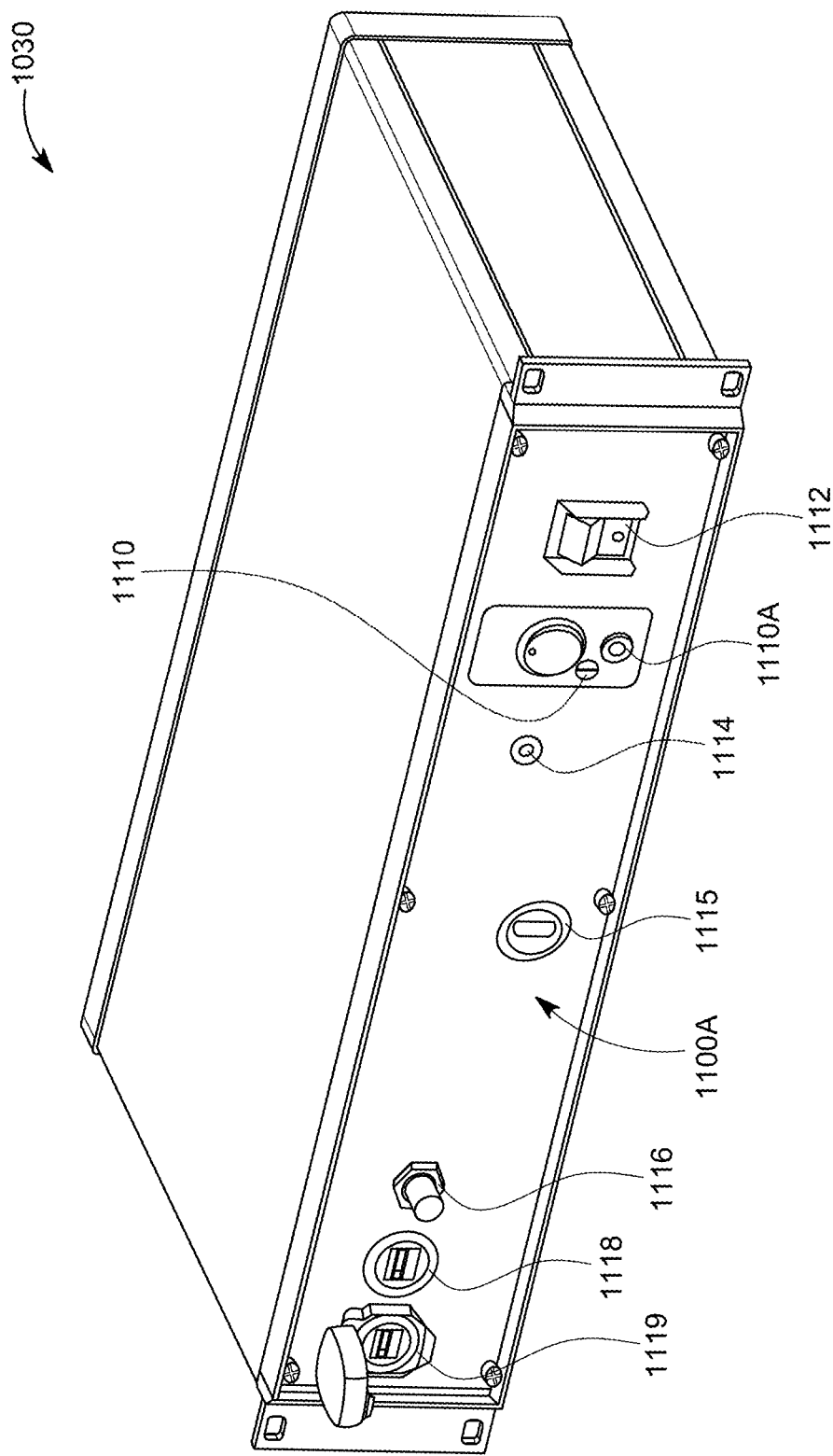
FIGS. 11A to 11D illustrate various details of a control unit of the docking station and FIG. 11E illustrates a coding scheme that is implemented for the docking station.

FIG. 11A shows a front face of the HCM module 1030 having a plurality of ports and indicators, among which, there is an on/off switch 1110 for the module, a corresponding LED indicator 1110A that is illuminated when the HCM is powered and is dark when there is no power to the HCM, a docking station general power switch 1112, which is configured to switch off the power to all the elements of the docking station 1000, another LED indicator 1114 that is configured to show a status of the HCM module, i.e., if there is any problem with the module, a video port 1115 for providing, for example, a video signal associated with the docking station, a power port 1116 for a monitor to be discussed later, a fast communication port 1118 for connecting to the monitor, and a USB port 1119 for servicing the HCM module. Those skilled in the art would understand that more or less ports and indicators may be added to the HCM module or these ports may be redistributed on another face of the module.

Figure 11B:
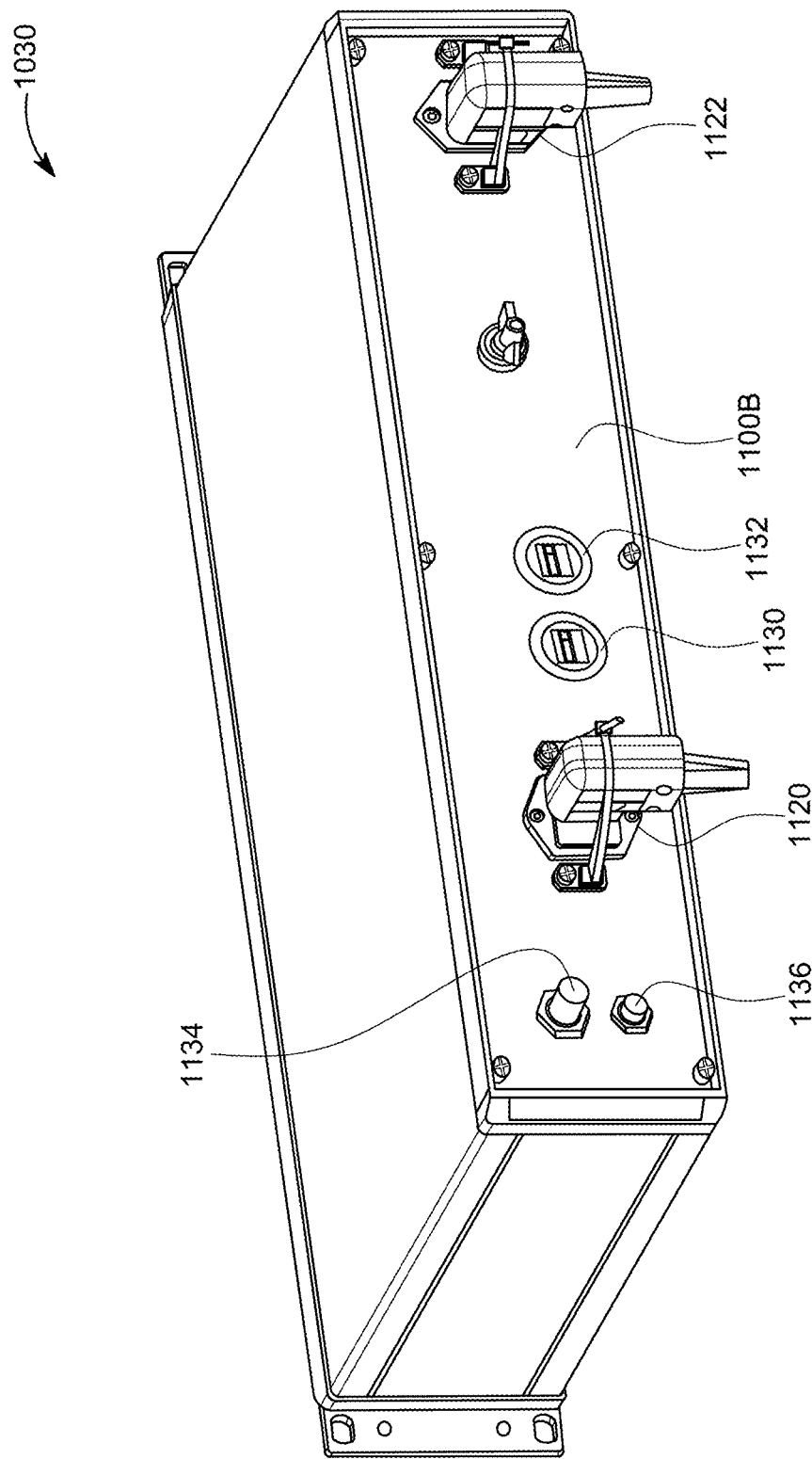

FIG. 11B shows a back face 1100B of the HCM module 1030 and this face also holds plural ports. For example, the back face includes a power in port 1120 that receives external electrical power. This power is then transmitted to the power out port 1122 for supplying the electrical power to the other elements of the docking station 1000. The power switch 1112 shown in FIG. 11A is configured to turn on and off the electrical connection between the port 1120 and the port 1122. The back face 1100B may further include a first network port 1130 for connecting to the network connection device 1020, and a second network port 1132, which also may be connected to the network connection device 1020, or to other elements of the docking station 1000, as shown in FIG. 11B. The back face may also have a power out port 1134 for service, for example, a 12 V output connector for service power supply, and optionally, a fuse 1136 for the power out port 1134.

Figure 11C:
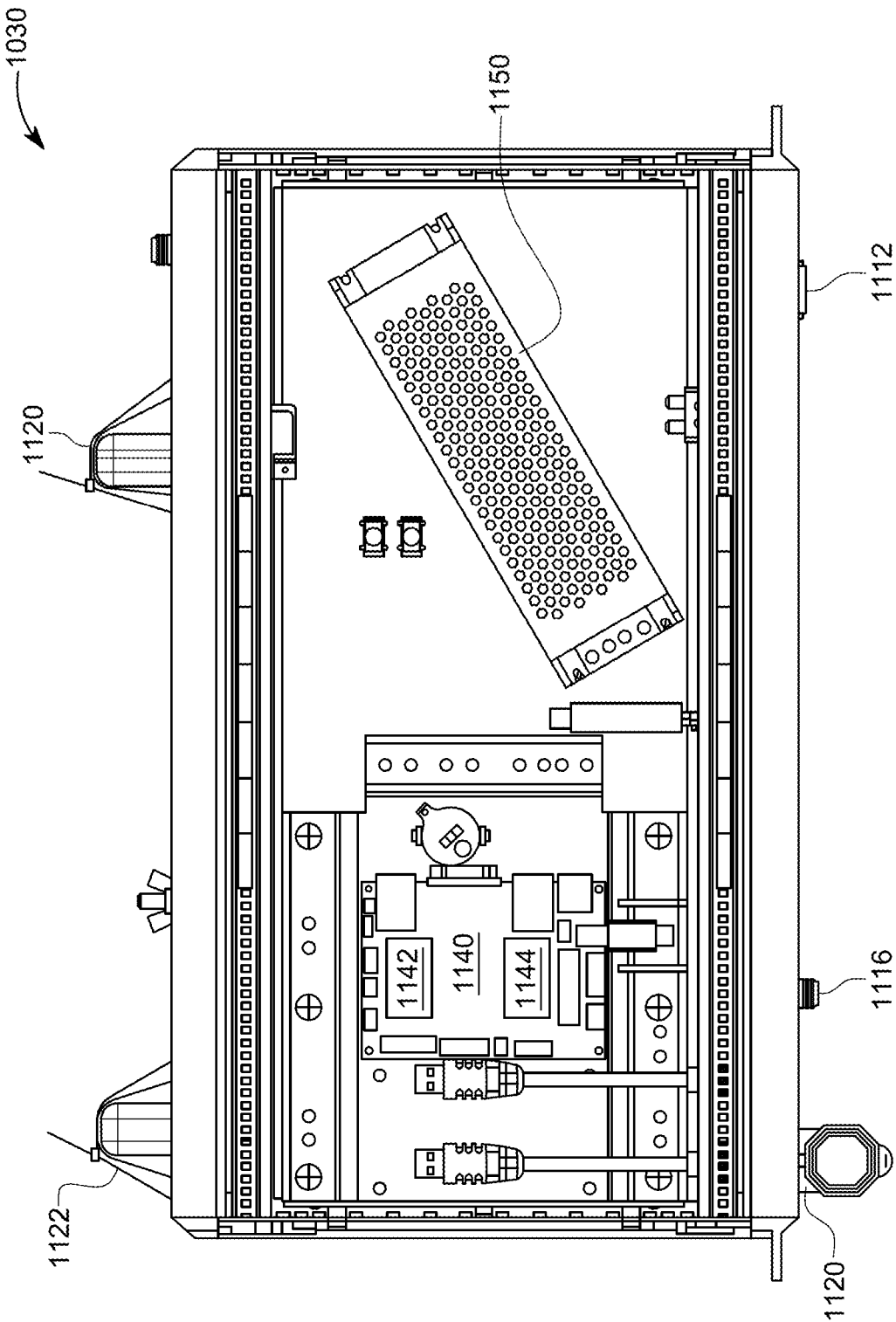

FIG. 11C shows internal components of the HCM module 1030. Some of these components include a PC card 1140 that includes at least a processor 1142 and a memory 1144. The PC card 1140 may be a computer board in one embodiment. The processor 1142 is configured to control the charging and data harvesting/transfer of the various nodes 300 and/or 400. In addition, the processor 1142 may be configured to update the firmware of the nodes, and/or test the nodes. The memory 1144 may be configured to store various commands and instructions that are used for updating the nodes, testing the nodes, charging the batteries of the nodes, and controlling the data transfer from the nodes to a server 1090, which is shown in FIG. 10.

Figure 11D:
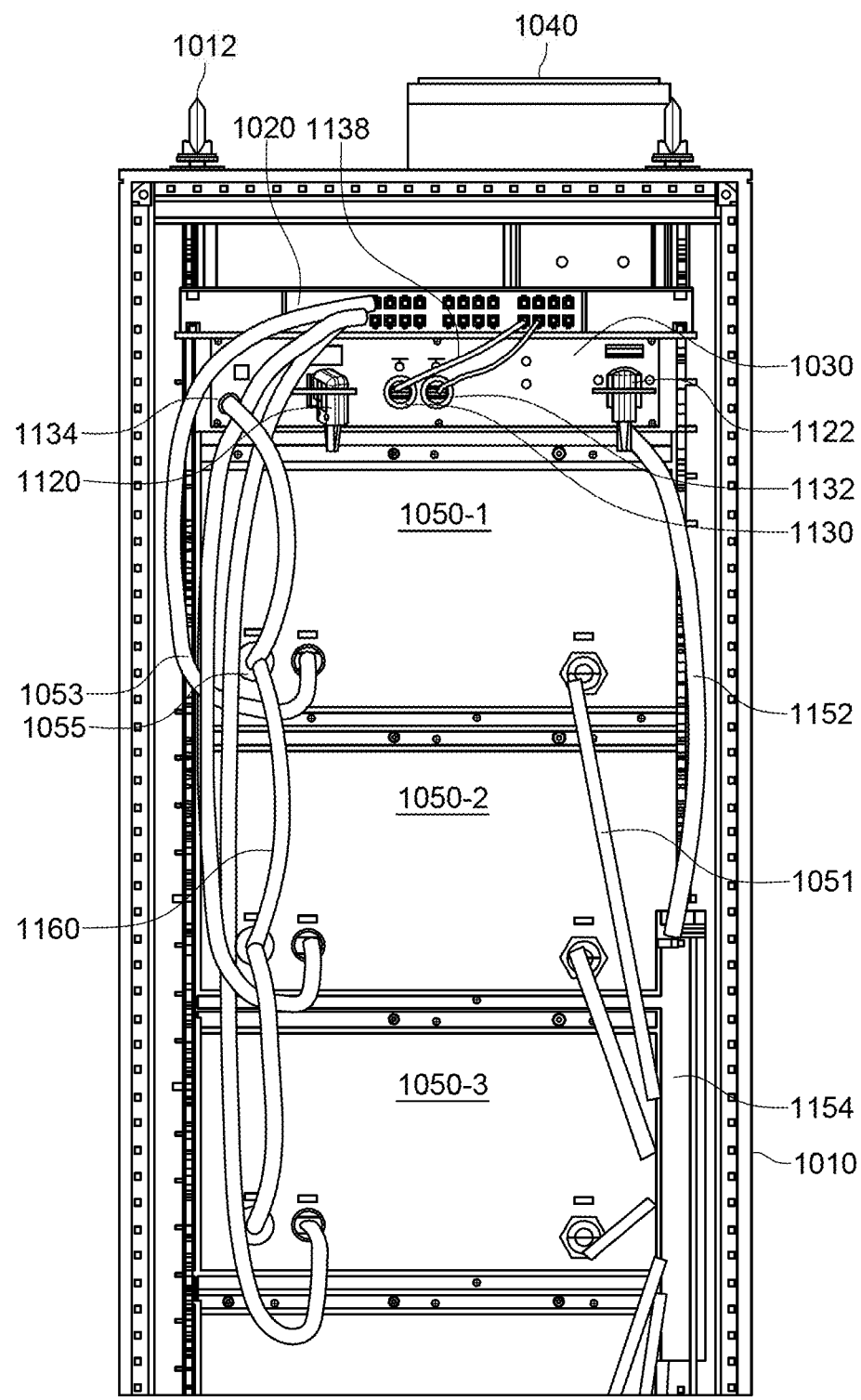

For achieving these capabilities, a power transformer 1150 is located inside the HCM module 1030 and this power transformer generates a low-voltage (for example, 12 V) that is used to feed the electronics inside the HCM module 1030, but also the electronics of each docking module 1050. Those skilled in the art will understand that any other voltage may be generated. The low-voltage from the power transformer 1150 is fed to the electronics of each of the docking module 1050. In one application, as illustrated in FIG. 11D, a power cable or wire 1152 extends from the HCM module 1030 to a central power strip 1154, and each of the docking module 1050 may be connected with a corresponding power cable 1051 to the power strip 1154 for receiving its voltage (for example, 220V, but other values are possible). FIG. 11D also shows that the HCM module 1030 is connected with two network wires 1138 (it is possible to use fewer or more wires, e.g., Ethernet cable) to the network connection device 1020, while each docking module 1050 is connected with a corresponding network cable 1053 (e.g., Ethernet cable) to the same network connection device 1020. In this way, a network is established between the HCM module and the docking modules, and data and/or commands between these elements can be exchanged.

Having these network and electrical connections between the various docking modules 1050 and also between the docking modules and the HCM module 1030, it is possible to code the data transmitted from each docking module to the HCM module so that the source of the data (i.e., from which node, and docking module each part of the data is originating) is known at the HCM module 1030. The coding scheme to be discussed next with regard to FIG. 11E can be implemented so that all the docking modules 1050 have the same electrical configuration, i.e., each of the 6 docking modules 1050 are identical. To avoid to configure the docking station 1000 any time that a docking module 1050 is added or removed (or in case of maintenance), a specific cable 1160 (shown in FIG. 11D) connects the power port 1134 of the HCM module 1030 to each corresponding power port 1055 of the docking modules 1050.

Figure 11E:
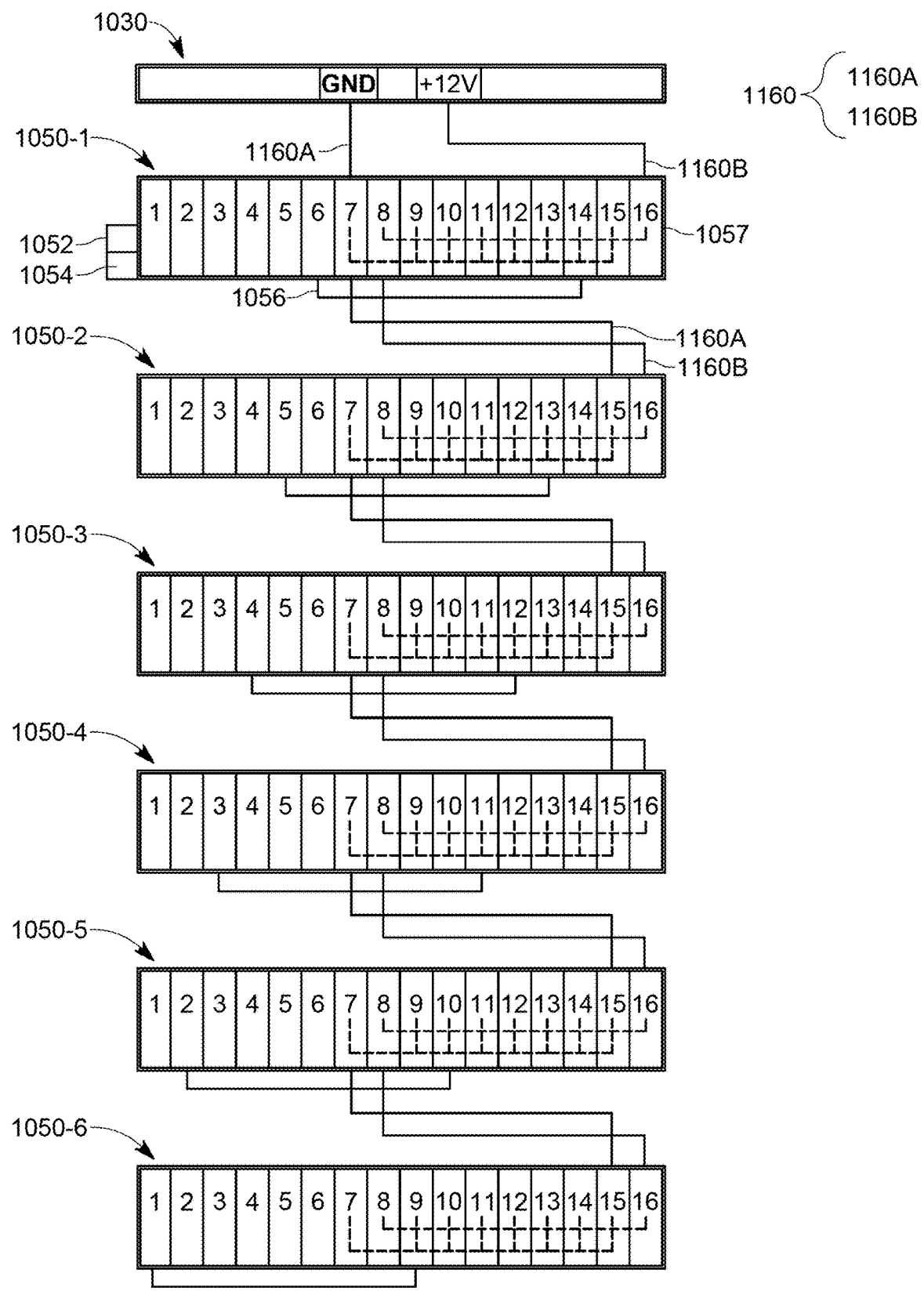

FIG. 11E illustrates part of the electrical configuration of the docking station 1000, and the various electrical connections between the HCM module 1000 and the docking modules 1050, and also some internal electrical connections of the docking modules 1050. Note that each docking module 1050 has an electronic board 1057 having 16 pins. The electronic board 1057 may also include a processor 1052 and a memory 1054. Other elements may be present on the electronic board 1057. The power cable 1160 that extends from the HCM module 1030 to each docking module 1050 has, in this embodiment, a ground wire 1160A that is connected to pin no. 7 of the electronic board 1057 of the first docking module 1050-1, and also has a signal wire 11606 that is connected to pin no. 16. Pin no. 7 is shown in FIG. 11E being internally connected to pin nos. 9-15 while pin no. 16 is internally connected to pin no. 8. Further, the figure shows that pin no. 7 is also connected to pin no. 15 of the second docking module 1050-2 through ground wire 1160A and pin no. 8 is electrically connected through signal wire 1160B to pin no. 16 of the second docking module 1050-2. These power connections are then repeated for the following docking modules 1050-3 to 1050-6.

FIG. 11E also shows a shunt wire 1056 that connects pin no. 6 to pin no. 14 for the first docking module, pin no. 5 to pin no. 13 for the second docking module, and so on. The shunt wire 1056 implements a unique pin connection for each docking module. This unique connection is read by the processor 1052 of each docking module and translated into a LEVEL code, that identifies the level of the respective docking module in the docking station, where the top docking module 1050-1 is LEVEL=1, and the most bottom docking module 1050-6 is LEVEL=6. An name and/or another value may be used for this parameter as long as it indicates the location of the docking module in the docking station.

In addition, each docking module 1050 has its processor connected to six docking bays and the processor 1052 is configured to identify each of the six docking bays, which is coded in a parameter LOCATION, with a value of 1 to 6. Another name for this parameter and other values may be used. When seismic data from the various nodes 300 is downloaded to the docking modules 1050, the processor 1052 in each docking module is configured to generate a value for the parameter LEVEL and a value for the parameter LOCATION, so that each batch of seismic data that is downloaded from a node is stamped with the values of the parameters LEVEL and LOCATION. The seismic data together with these values are then transmitted by each docking module to the HCM module, for example, along network cables 1053 and network connection device 1020.

Returning to FIG. 10, the docking station 1000 further includes a screen or monitor 1040 that is attached to the frame 1010. The screen 1040 may be a touch screen. The screen 1040 is connected with a power cable to the power port 1116 of the HCM module 1030, and with a communication cable to the port 1118, for sending commands to the processor 1142 located inside the module 1030. For example, the screen 1040 may be a touch screen that allows the operator of the docking station to see all the nodes connected to the docking station, their battery level, the amount of seismic data that has been transferred from the nodes to the docking station, the status of the nodes, the firmware version of the nodes, and any other information related to the nodes. The operator may use the touch screen 1040 to update the firmware of a given node or set of nodes. The operator may also use the touch screen to reconfigure the software of a given node or set of nodes. In one application, the operator may run various tests on a given node or set of nodes using commands that are input directly though the touch screen. The operator may stop or start the seismic data transfer from the node to the server 1090 associated with the docking station 1000 at any time through the touch screen 1040. In still another application, the screen 1040 is configured to provide visual indications/signals to the operator about the status of a node or set of nodes. For example, the screen may display all the nodes that are currently being charged in red, and all the nodes that are fully charged in green. Many other indications and various parameters associated with the nodes may be displayed by the screen 1040.

The docking station 1000 also includes plural docking modules 1050. FIG. 10 shows 6 different docking modules 1050. However, the docking station may be configured to have more or less docking modules, depending on the application. The reference number 1050 is used herein to indicate a generic docking module while a reference number 1050-1 is used to refer to a specific docking module. The docking modules are attached to the frame 1010 with screws in this embodiment. However, the docking modules may be attached with other means to the frame, for example, clips, or they may slide into dedicated tracks.

Each docking module 1050 has the same configuration and is capable of receiving (1) only DFU nodes, (2) only AFU nodes, or (3) a mixture of DFU and AFU nodes. The same docking module 1050 can be reconfigured to receive one of the nodes configuration (1) to (3). While FIG. 10 illustrates each docking module 1050 having 6 docking bays 1060, it is possible to size the docking module to have less or more docking bays. The reference number 1060 is used herein to generically refer to a docking bay. When referring to a specific docking bay, the reference numbers 1060-1, 1060-2 and so on will be used.

Figure 12A:
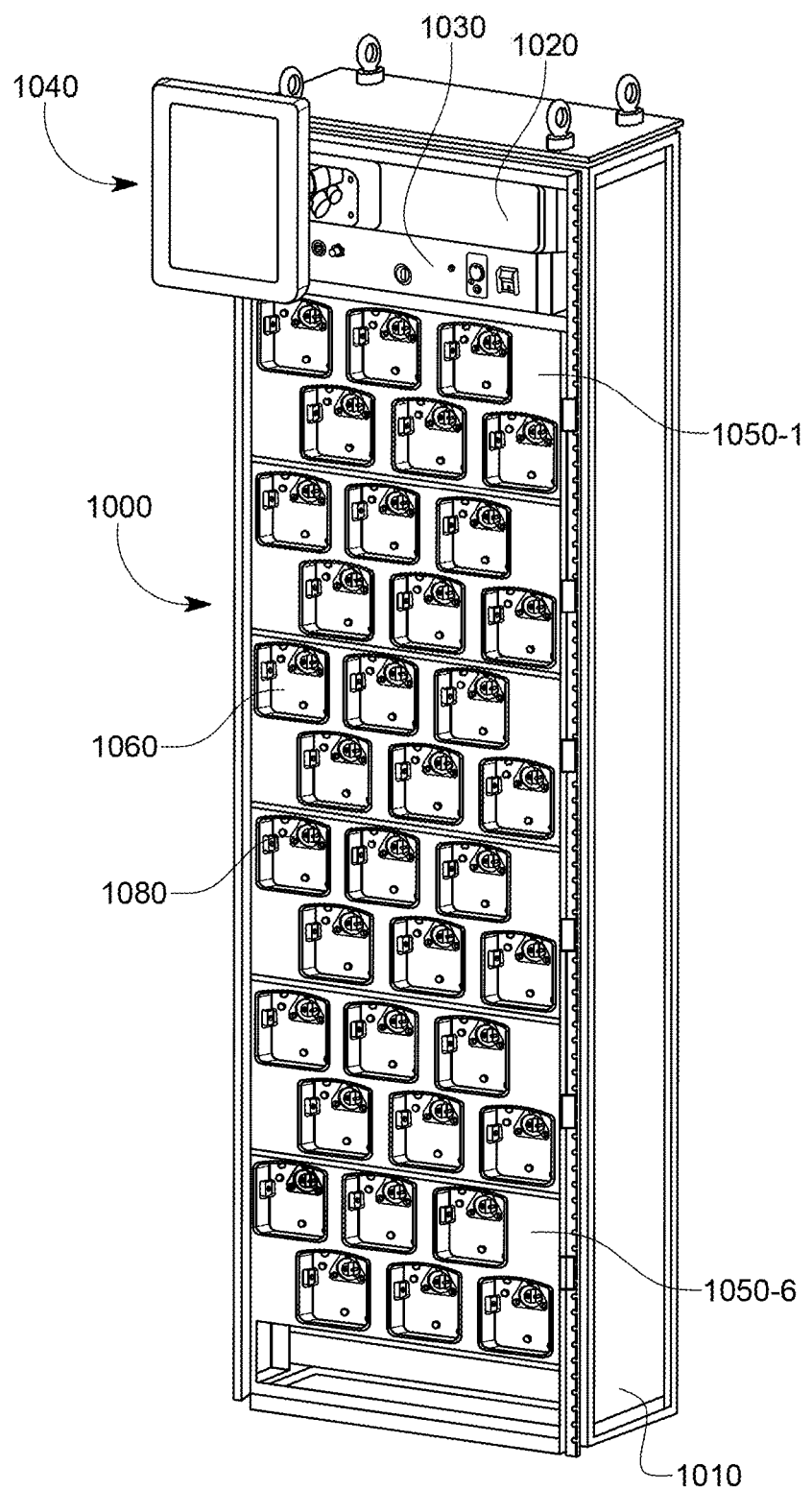
Figure 12B:
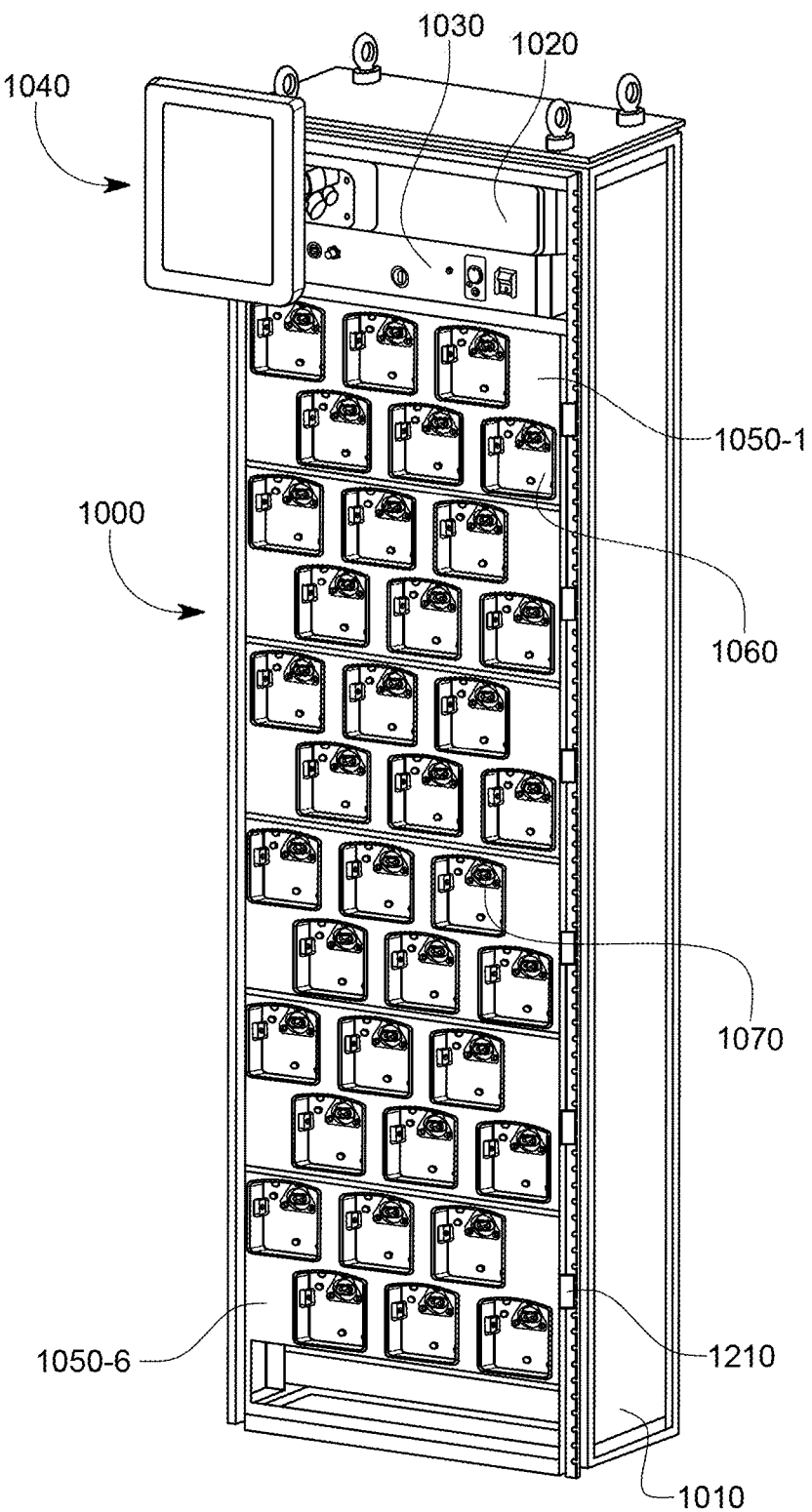
FIG. 12B illustrates the docking station configured to receive digital nodes.

FIG. 12A shows the docking station 1000 configured with analog ports 1080 for receiving AFU nodes 400 while FIG. 12B shows the docking station configured with digital ports 1070 for receiving DFU nodes 300. The configuration in which the same docking station is configured to receive both the DFU and AFU nodes is not shown. Note that the same docking bays are used for both configurations, except that different ports for the docking bays are used to accommodate one or the other node. Further, each of the FIGS. 12A and 12B shows that an indicator 1210 is affixed to the frame 1010 for indexing the docking modules in a visible way, and independent of the docking module. In one embodiment, the indicator 1210 is a physical label. In another embodiment, the indicator 1210 is an LCD display that is controlled by the HCM module 1030, and the value displayed can be modified/changed as desired by the operator of the HCM module.

Figure 13A:
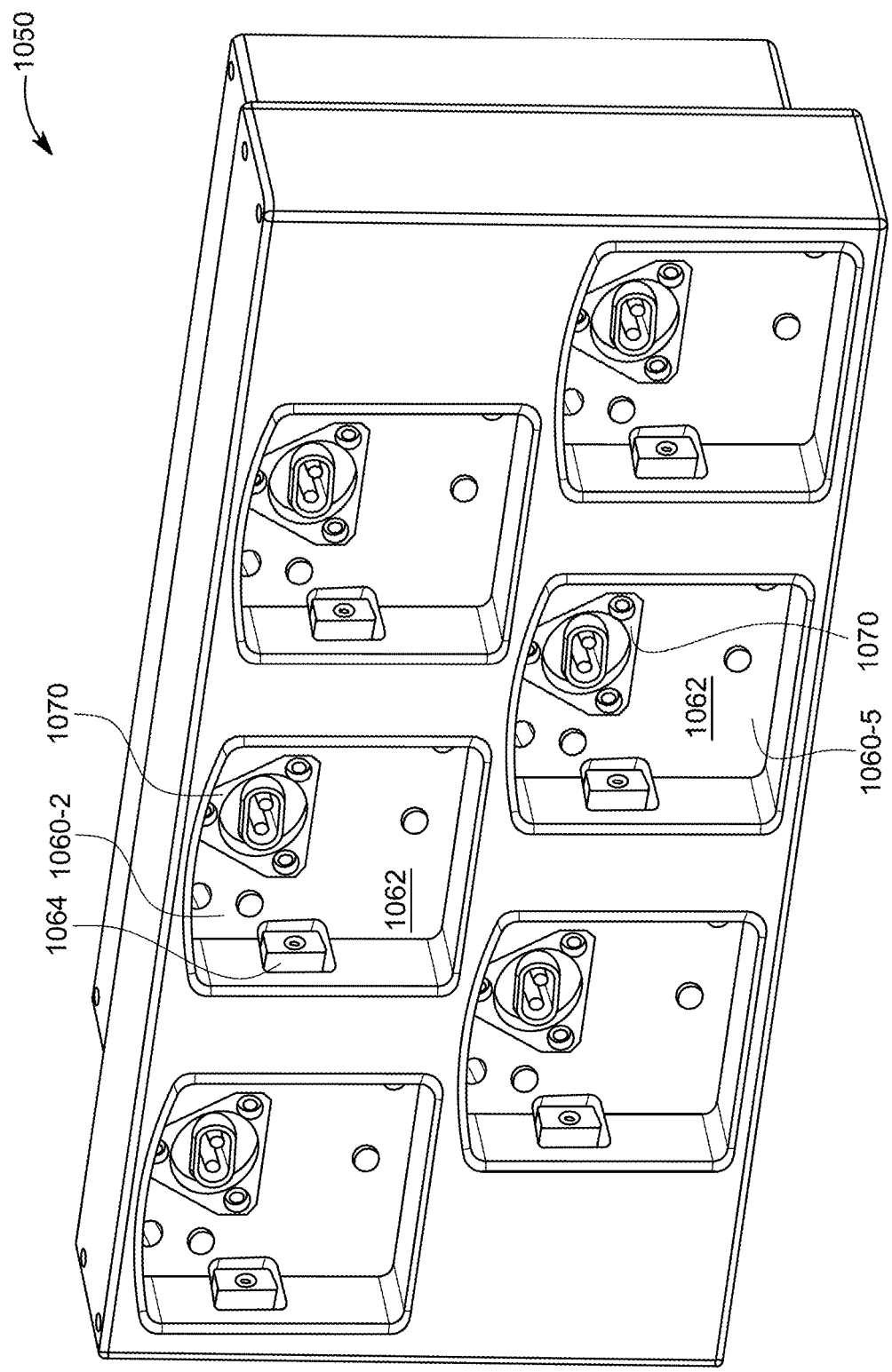
FIG. 13A shows a docking module of the docking station configured to receive digital seismic nodes.
Figure 13B:
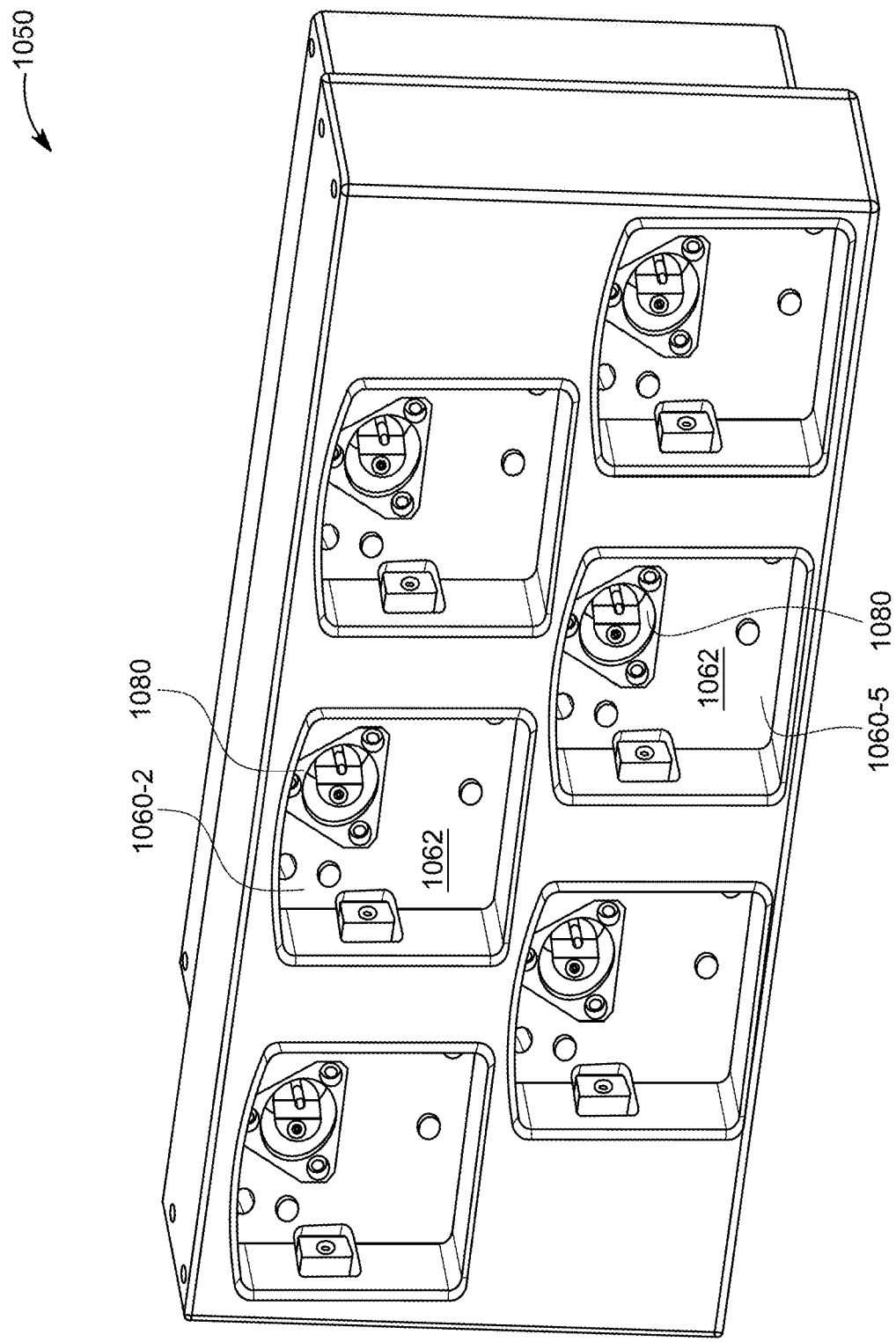
FIG. 13B shows a docking module configured to receive analog seismic nodes.
Figure 13C:
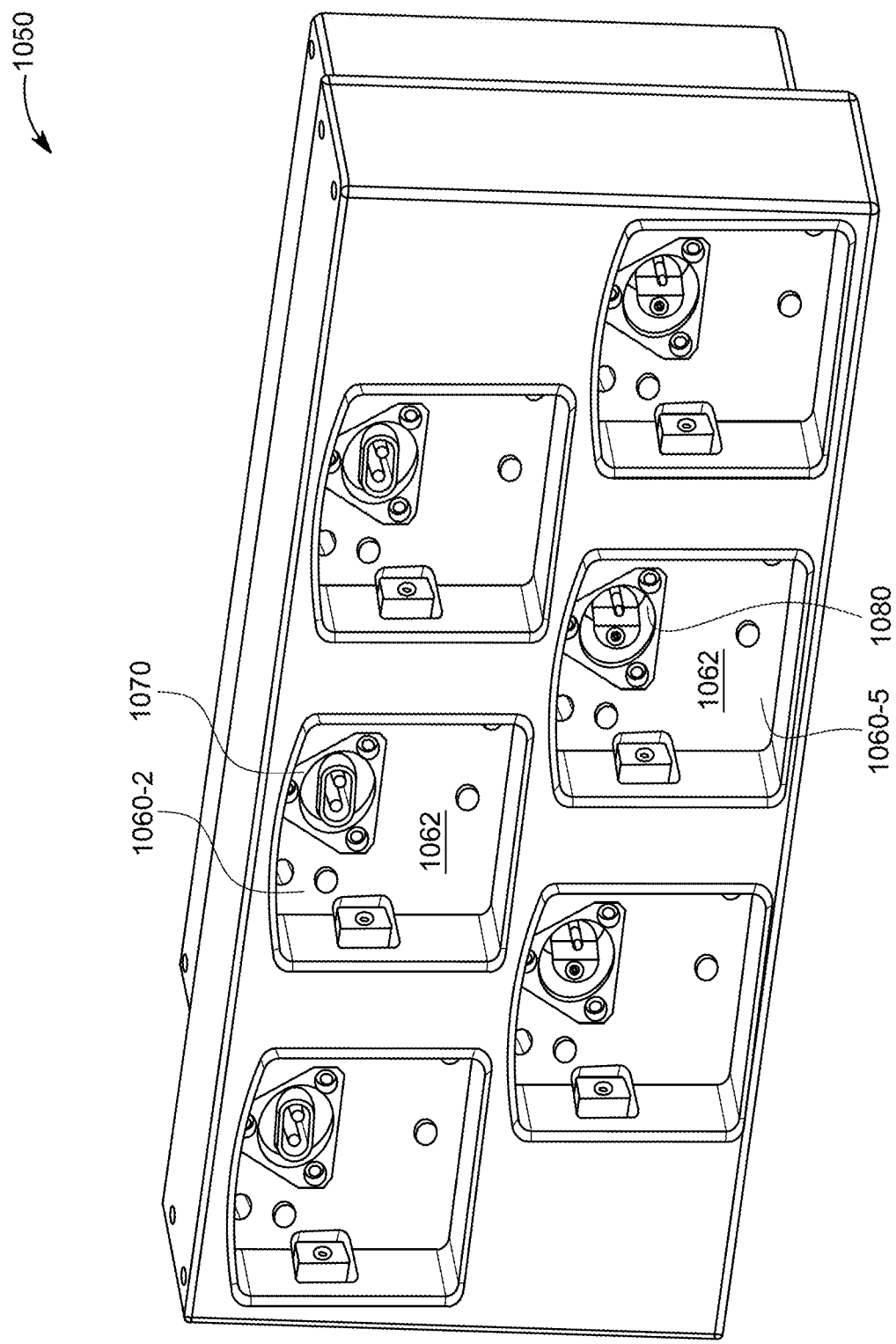
FIG. 13C shows a docking module configured to receive digital and analog seismic nodes.

A docking module 1050 can be configured to receive DFU nodes 300, as shown in FIG. 13A, or to receive AFU nodes 400 as shown in FIG. 13B, or to receive a mixture of DFU and AFU nodes as shown in FIG. 13C. The first configuration of the docking module 1050, shown in FIG. 13A, called herein the digital configuration, uses a digital port 1070 placed in each docking bay 1060-2 and 1060-5 (only two docking bays are labeled in FIG. 13A, but all the docking bays have the same configuration). The second configuration of the docking module 1050, shown in FIG. 13B, called herein the analog configuration, uses an analog port 1080 in the docking bays 1060-2 and 1060-5 (only two docking bays are labeled in FIG. 13B, but all the docking bays have the same configuration). The third configuration of the docking module 1050, shown in FIG. 13C, called herein the hybrid configuration, uses a digital port 1070 for the docking bay 1060-2 and an analog port 1080 for the docking bay 1060-5. Again, only two docking bays are labeled in FIG. 13C, but it is possible that a first subset of all docking bays to have the digital ports and a second subset of all the docking bays to have the analog ports, where the first and second subset may be equal or less than the entire set of docking bays of a given docking module.

Each of the FIGS. 13A to 13C also shows that each docking bay includes a receptacle 1062 that is configured to receive the cover 320 or 420 of the DFU or AFU nodes. The receptacle 1062 is configured to have, in cross-section, exactly the same shape as the cover 320 or 420. The receptacle 1062 may be made of plastic or rubber or a composite material and may have a depth so that the entire cover of the DFU and AFU nodes fits inside the receptacle. Further, the figures show that each receptacle 1062 has a pair of tabs 1064 (only one is visible in the figures) formed on opposite walls of the receptacle, for engaging with the recesses 324 (see FIG. 5) formed in the covers of the nodes so that a good and stable mechanical coupling is achieved between each node and its corresponding docking bay.

Figure 14A:
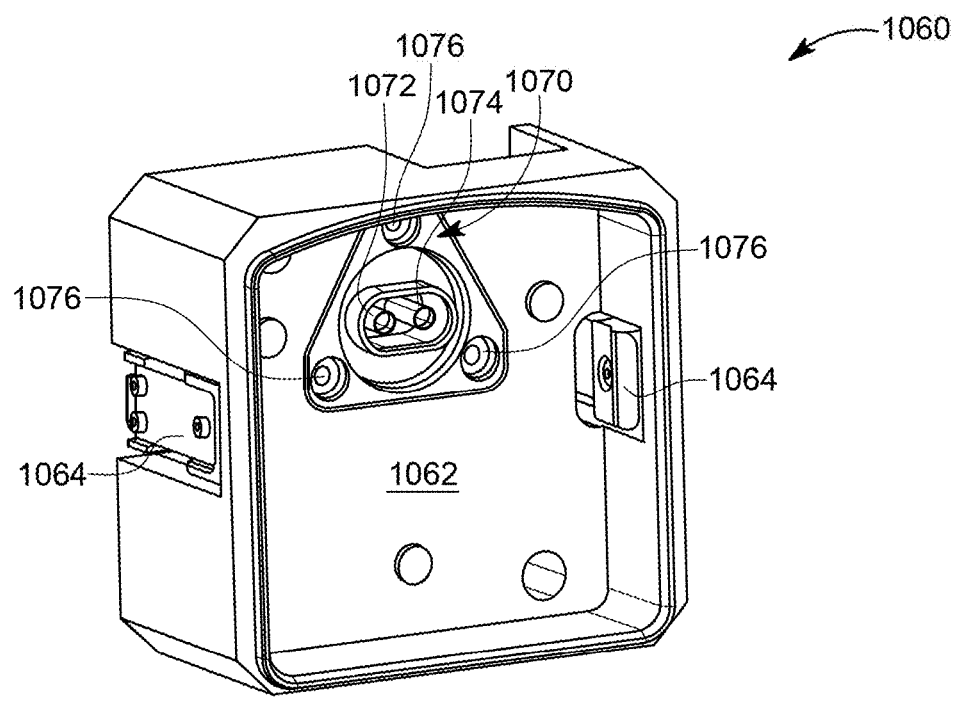
FIGS. 14A and 14B illustrate a docking bay of a docking module and a seismic node engaged with the docking bay.
Figure 14B:
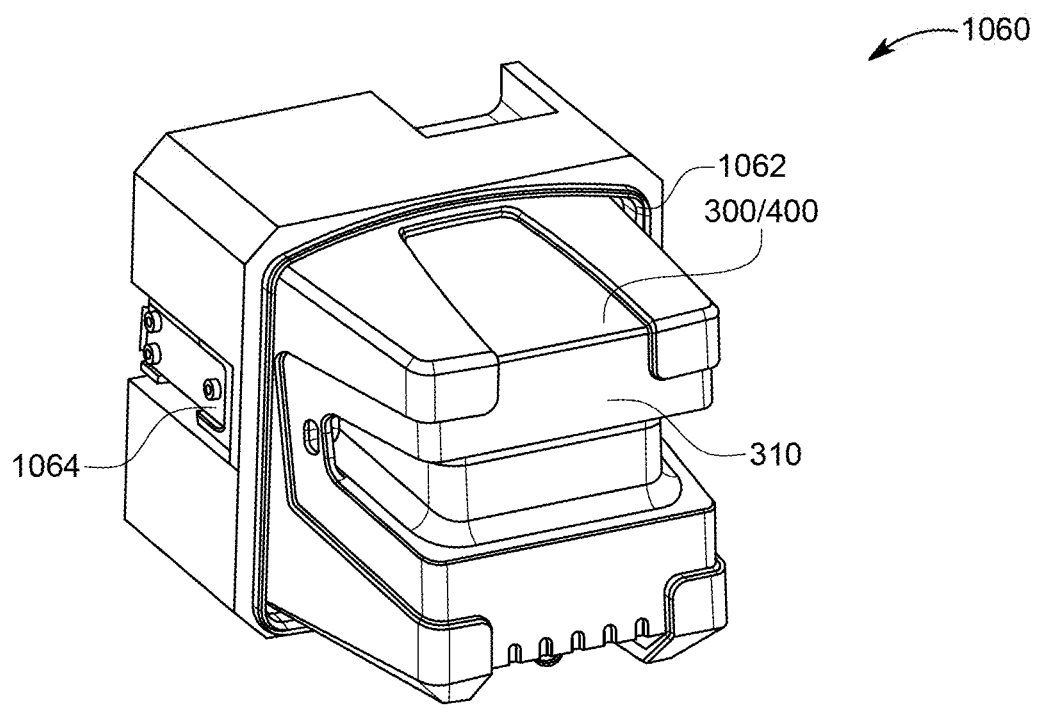
Figure 14C:
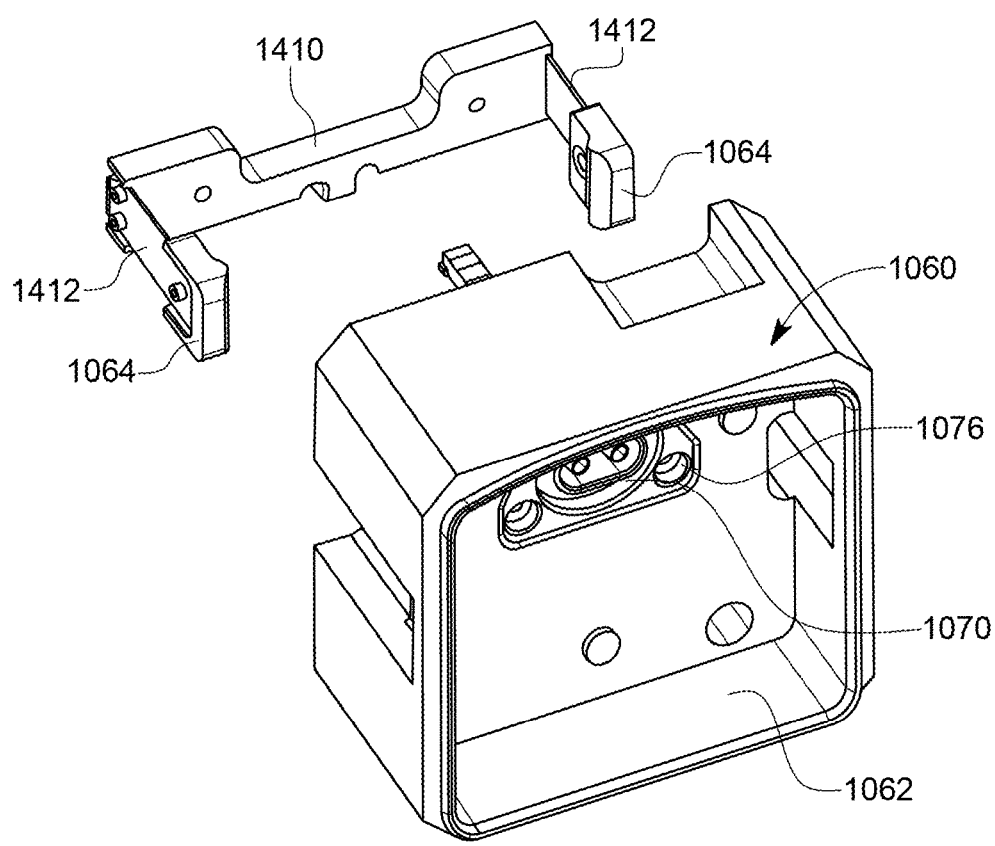
FIG. 14C illustrates a connecting mechanism of the docking bay.

FIG. 14A shows in more detail a docking bay 1060 and its receptacle 1062 with the pair of tabs 1064. FIG. 14A also shows the digital port 1070 having first and second electrical tubular members 1072 and 1074 that are configured to mechanically and electrically engage with the first and second pins 332 and 334 of the cover 320 of the DFU node 300. Further, FIG. 14A shows that the digital port 1070 is attached in this embodiment with three screws 1076 to the receptacle 1062. Those skilled in the art would understand that more or less screws may be used within the scope of the invention, and even other means may be used to fix the digital port to the receptacle. FIG. 14B shows a digital node 300 being attached to the receptacle 1062. Note that in one embodiment, the cover 320 of the node may be fully located within the receptacle so that only the base 310 is visible. FIG. 14C shows the pads 1064 removed from the receptacle 1062. The two pads 1064 may be attached to a beam 1410, through side beams 1412. The side beams 1412 are made of an elastic material so that the pads 1064 can slightly move toward and away from the cover of the node when the node enters or exits the receptacle.

Figure 15:
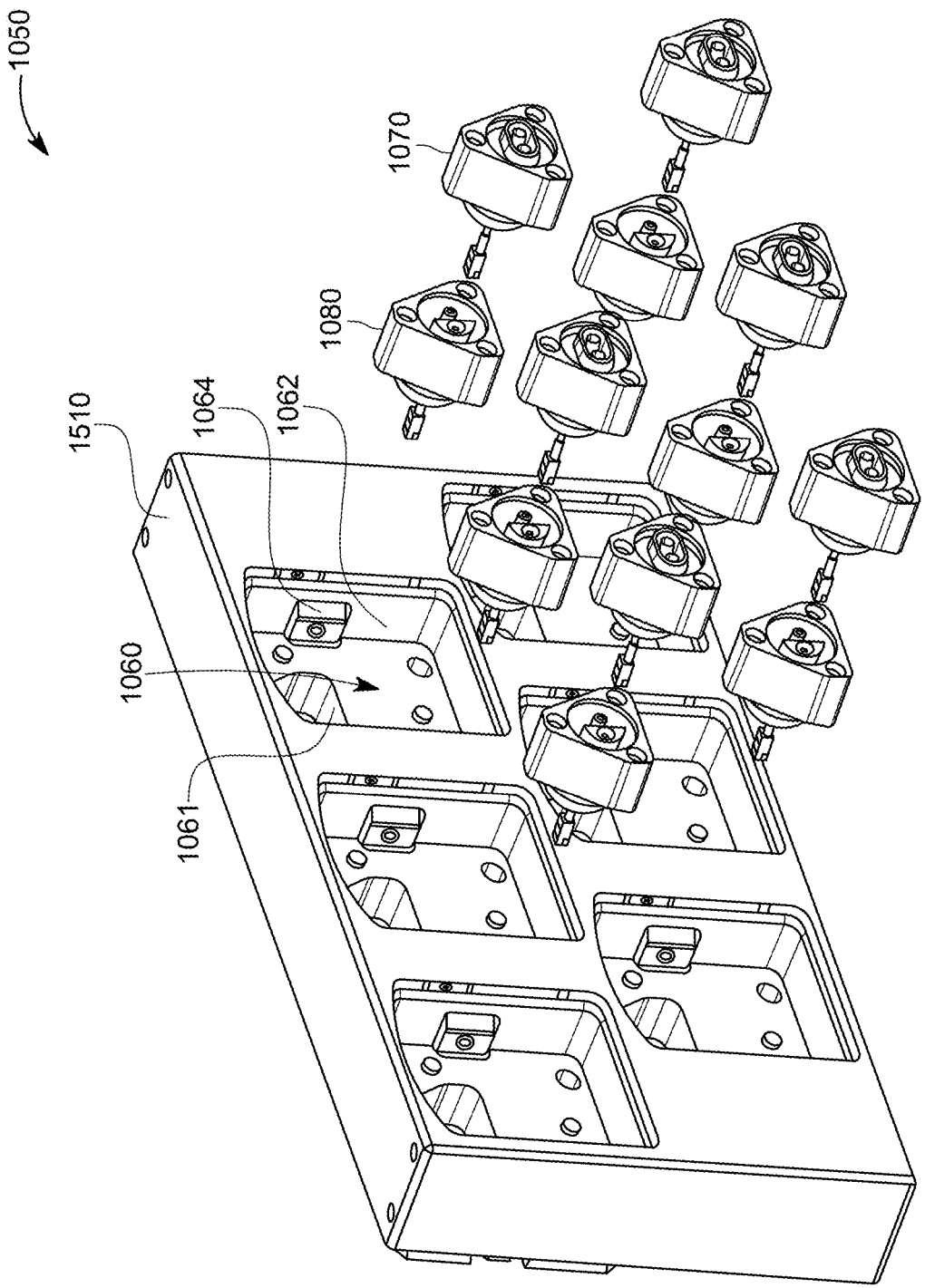
FIG. 15 illustrates a docking module and corresponding digital and analog ports.

FIG. 15 shows a docking station 1050 having a housing 1510 that is configured to receive six docking bays 1060. FIG. 15 also shows the digital ports 1070 and the analog ports 1080 removed from their corresponding receptacles 1062. As previously discussed, the digital ports and the analog ports are interchangeably attached to the receptacle. The digital and analog ports are configured to slide into corresponding recesses 1061 formed in the receptacle 1062 of each docking bay 1060. FIG. 15 shows that an exterior shape of the digital ports and the analog ports are identical so that they fit in the same recess 1061 in the docking bay 1060. In this embodiment, the exterior shape of the digital and analog ports are triangular in cross-section. However, the cross-sections shapes of these ports may also be rectangular, square, diamond, or any other shape. In one embodiment, the color of the digital ports is different from the color of the analog ports so that the operator of the docking station can, with a single glance, identify what type of ports are in use. Also, when the ports needs to be swapped, by having different colors for the analog and digital ports, prevents the operator of the station to install the wrong port.

Figure 16:
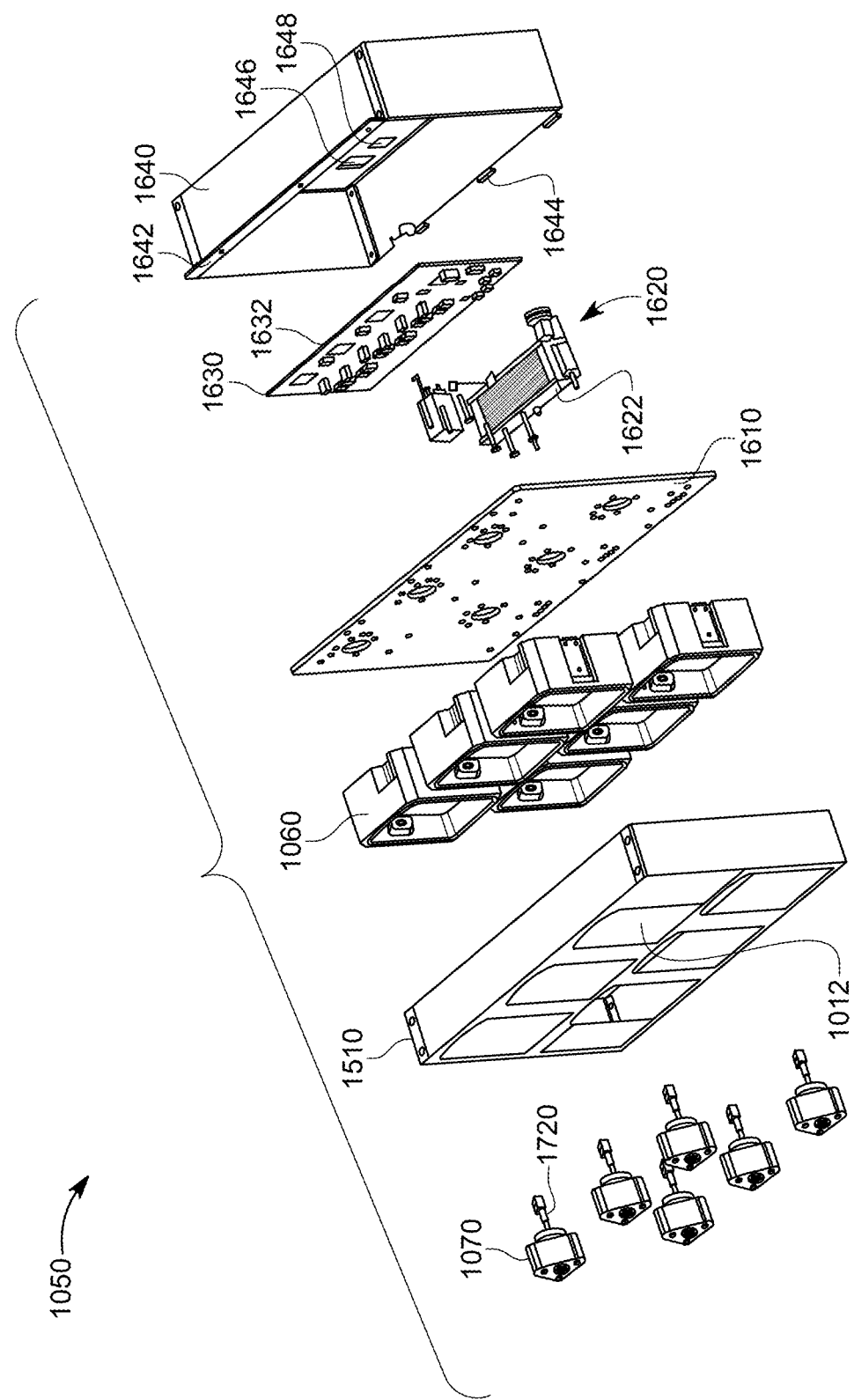
FIG. 16 is an exploded view of a docking module.

An exploded view of the docking module 1050 is shown in FIG. 16 and includes the digital ports 1070 (and/or analog ports 1080), housing 1510, and docking bays 1060. While the docking bays 1060 are configured to fit into corresponding slots 1012 into the housing 1510, they are mechanically attached, for example, with screws, to a board 1610. The docking module 1050 also includes electrical components 1620. Among the electrical components 1620, there is a power transformer 1622, that is configured to step down an incoming voltage (220 or 110V) to a given low voltage (e.g., 5V) that is distributed to each docking bay for recharging the various nodes. In this regard, note that each docking module 1050 may have an electrical power port, attached to the back of the support housing 1640, which is configured to be connected to an electrical outlet, present inside the docking station 1000. For example, the power out port 1122 of the HCM module 1030 may be connected to a power strip located inside the frame 1010 of the docking station 1000 and the power strip may include plural power outlets, one for each docking module. The low-voltage end of the power transformer 1622 is connected to each of the digital or analog ports of the docking bays for that module, through an electrical contact, that is discussed later. The docking module 1050 may also include a printed circuit board 1630 that includes at least a processor 1632, whose functions include, but are not limited to, monitoring each node, its status, the battery level of the node, coordinating the seismic data transfer from the node to a server, applying an update to the software of the node, and testing the node. The processor 1632 is a local processor. The processor 1632 (in one embodiment, there are more processors in each docking module) may cooperate with the global processor 1142 of the HCM module 1030 in implementing all these functions.

All these electronic elements are placed in the housing support 1640, which may be a metallic box having a lip 1642 with one or more holes that allow the entire docking module to be attached with screws to the frame 1010 of the docking station 1000. In one embodiment, the housing support 1640 is configured to mate with the housing 1510 so that one side of each of these elements uses a clamp like system 1644 to engage with each other, while an opposite side of these two elements can be joined with screws or equivalent devices. A power port 1646 may be fixed to the back of the housing support 1640 for receiving, through the cable 1051 discussed above with regard to FIG. 11D, the voltage (e.g., 12V as discussed above with regard to the HCM module) from the power strip 1154 located inside the docking station. A communication port 1648 (for example, Ethernet port or any other port that allows data communication) may also be attached to the back of the housing support 1640 and this port is connected, through cable 1053 discussed in FIG. 11D, to the network connection device 1020, for getting access to the internet or an internal network that is used for transferring the seismic data from the node to a server. In one embodiment, the server may be located anywhere, remotely or closely to the docking station. In one application, the server may be located inside the docking station. Regardless of where the server is located, it is connected to the network connection device 1020, either directly, or over a private network, or over the internet for receiving the seismic data from each node.

Figure 17A:
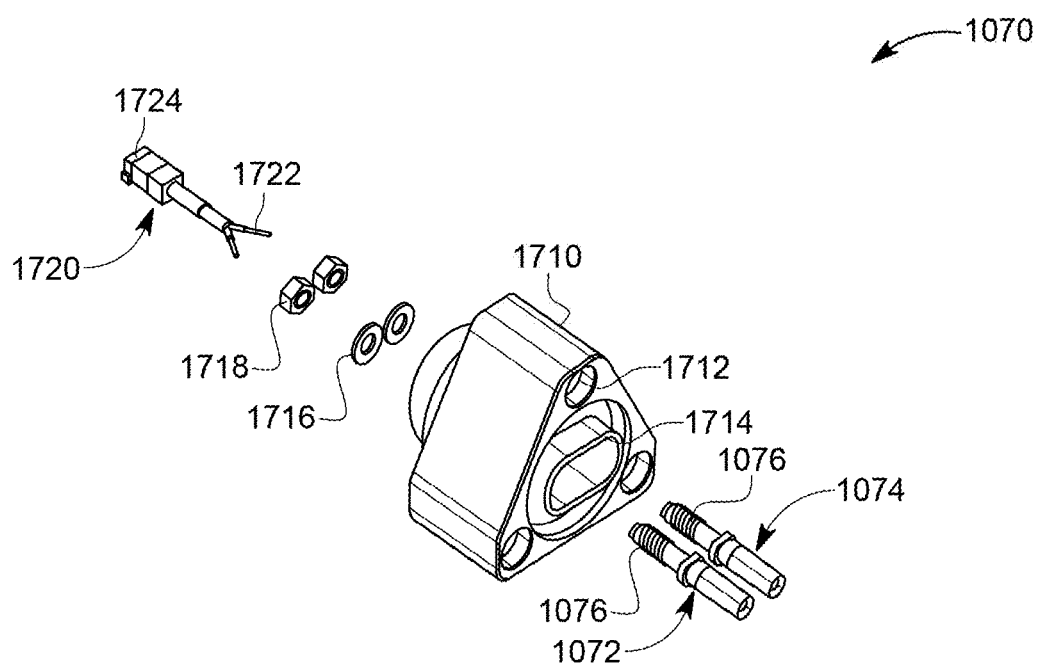
FIG. 17A is an exploded view of a digital port and FIG. 17B is an exploded view of an analog port.
Figure 17B:
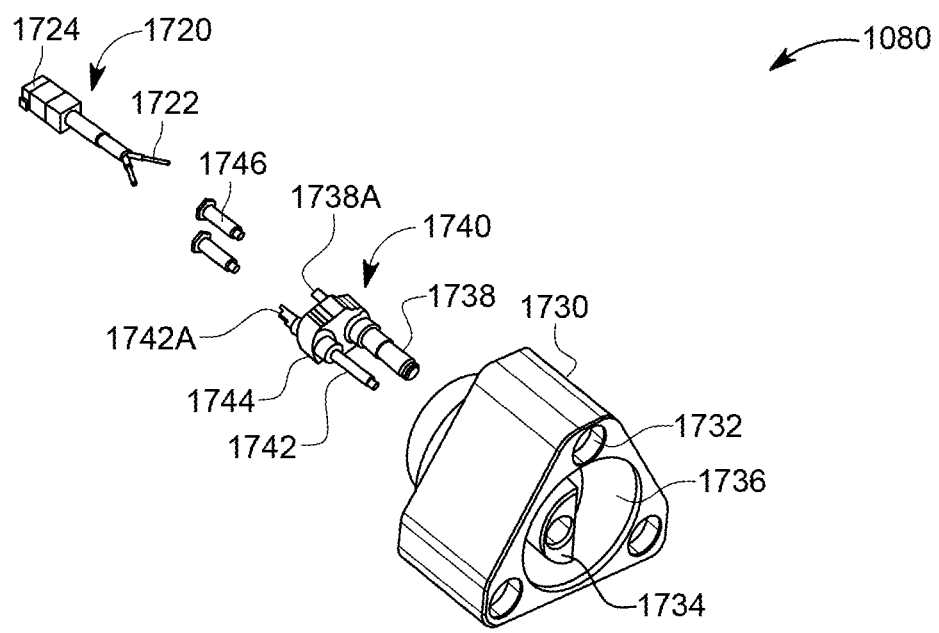

Regarding the digital and analog ports 1070 and 1080, they are shown in an exploded view in FIGS. 17A and 17B. FIG. 17A shows the digital port 1070 having a body 1710 that has a triangular cross-section. As previously discussed, the body 1710 may have other shapes, as long as the recess 1061 formed in the receptacle 1062 of the docking bay 1060 has the same cross-section shape. The body 1710 has in this embodiment three holes 1712 that are configured to receive corresponding screws 1076, as shown in FIG. 14A. As also previously discussed, the body 1710 may have only two or more than three holes, depending on the shape of the body. The body 1710 has an internal lip 1714 formed in a central part, that is configured to protect the first and second tubular pins 1072 and 1074. In one embodiment, the first and second tubular pins are identical.

The first and second tubular pins 1072 and 1074 may be configured to have a thread 1076 at one end, which is configured to engage a corresponding washer 1716 and nut 1718, to fix the tubular pins to the body 1710. An electrical connection 1720 may have two wires 1722 that are configured to enter the ends of the tubular pins 1072 and 1074, and be crimped there, to achieve electrical connection. The electrical connection 1720 is configured to have a head 1724 that connects, for example, to the printed circuit board 1630 (see FIG. 16) of the docking module 1050. In fact, FIG. 16 shows the digital ports 1070 and their back electrical connection 1720. The back electrical connection 1720 is configured to attach to the printed circuit board 1630 in a wireless manner. The term "wireless" is used in this paragraph to mean that no manual connection is necessary between the head 1724 and the printed circuit board 1630, as the head 1724 is configured to simply slide into a receiving contact on the printed circuit board 1630 for achieving the electrical connection. In this regard, the connection between the back pins of the cover 320 or 430 and the strips 522 in FIGS. 5 and 7 is also achieved in a wireless manner, i.e., there is no need of manual connection between these elements to achieve electrical connection. With this wireless electrical connection, after the screws of the digital port 1070 are removed, the digital port 1070 can simply be removed from the corresponding receptacle and the analog port 1080 can be inserted in its place.

The analog port 1080 is shown in FIG. 17B as having a different type of body 1730 than the digital port 1070. A cross-section of the body 1730 is identical to the cross-section of the body 1710 as both these bodies have to fit in the same recess 1061 in the receptacle 1062. However, the body 1730 has, instead of the lip 1714, a half-part 1734 that occupies about a half of the recess 1736 formed in the body 1730. The other half of the recess 1736 is empty. This configuration of the analog port 1080 corresponds to the connecting mechanism 900 illustrated in FIG. 9A. In this regard, note that the pin 902 of the connecting mechanism 900 would fit inside a tubular pin 1738 of the electrical part 1740, that fits into the body 1730. The electrical part 1740 has, in addition to the tubular pin 1738, a pin 1742 that fits into the tubular member 904 of the connecting mechanism 900. Note that the configuration of the connecting mechanism 900 is also used for the external connection plug 430 of the cover 420 in FIG. 4A, except for the sleeve 910. Returning to FIG. 17B, the tubular pin 1738 and the pin 1742 are attached to a holding part 1744, which is made, for example, from plastic, and is configured to hold these elements separated from each other. The tubular pin 1738 and the pin 1742 extend through the entire holding part 1744 and have corresponding back pins 1738A and 1742A, respectively. The back pins 1738A and 1742A may be connected to transition elements 1746, and also to the wires 1722 of the electrical connection 1720. The back pins 1738A and 1742A, transition elements 1746, and the wires 1722 may be crimped together to achieve good mechanical and electrical connection. Because the digital port 1070 and the analog port 1080 share the same electrical connection 1720, they can be easily interchanged and placed in the receptacle 1062.

Figure 18:
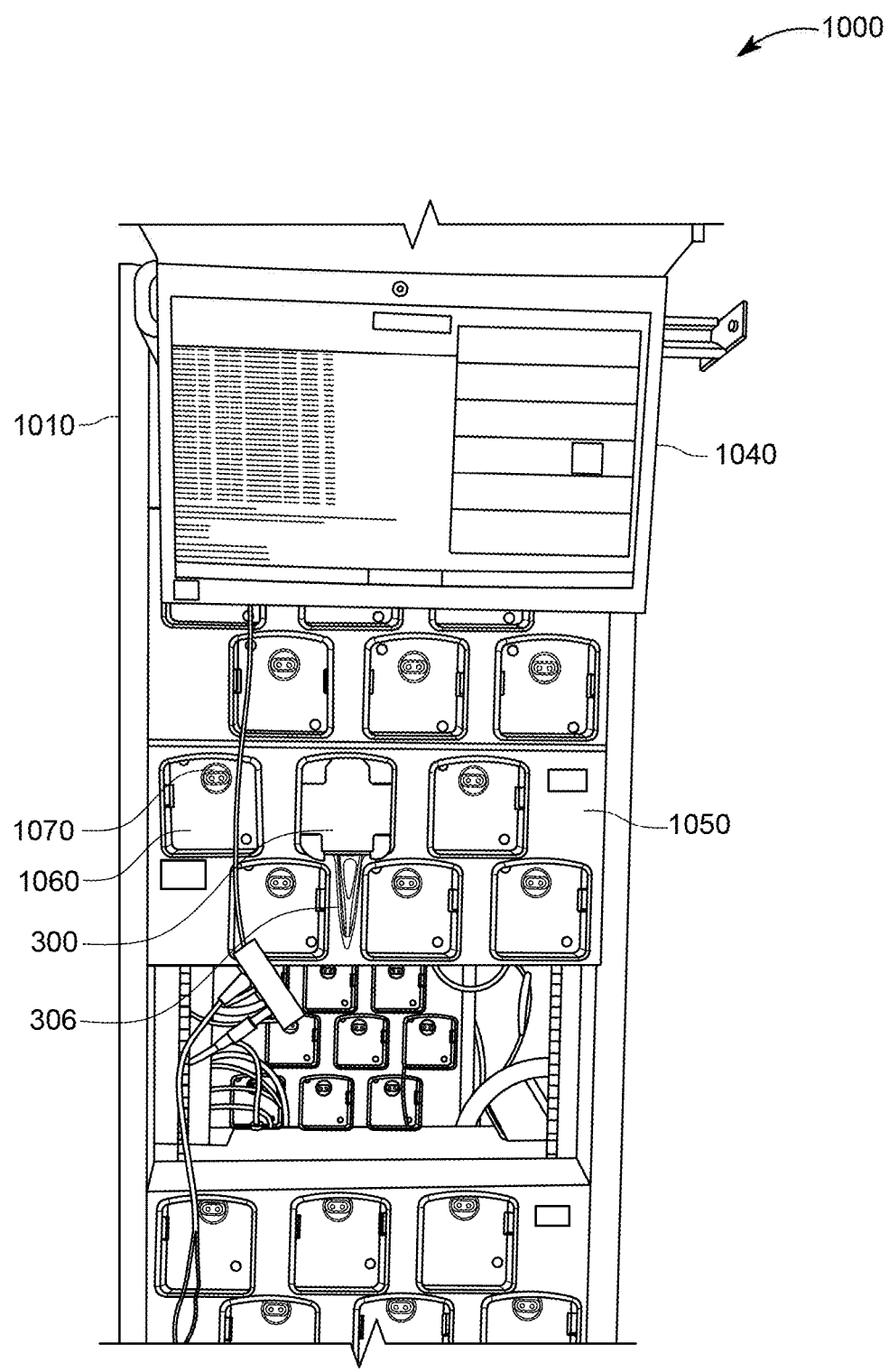
FIG. 18 is an overview of a docking station having plural docking modules, each docking module having plural docking bays.

FIG. 18 illustrates an operational docking station 1000 that has plural docking modules 1050 provided in the same frame 1010. The touch screen 1040 is attached to the top of the frame 1010, so that it is easy for the operator of the station to monitor the various modules. In one application, the touch screen 1040 displays all the docking modules 1050, but also all the docking bays 1060, so that the status of each node 300 and/or 400 is known. Further, the docking bays 1060 are so distributed in the docking module 1050 so that the DFU node 300 may be placed into a corresponding docking bay 1060 together with its spike 306, i.e., the spike 306 does not have to be removed prior to attaching the node to the docking bay. FIG. 18 shows that the spike 306 extends between two docking bays located below the current docking bay. This means that the base 310 is configured to have the receiving unit 350, to which the spike 306 is attached to, offset from the cover 320 or 420 with a distance enough to allow the receiving unit 350 to remain outside the receptacle 1062 of the docking bay 1060. This novel feature makes the process of placing the node into the docking module quick, thus saving time.

Figure 19:
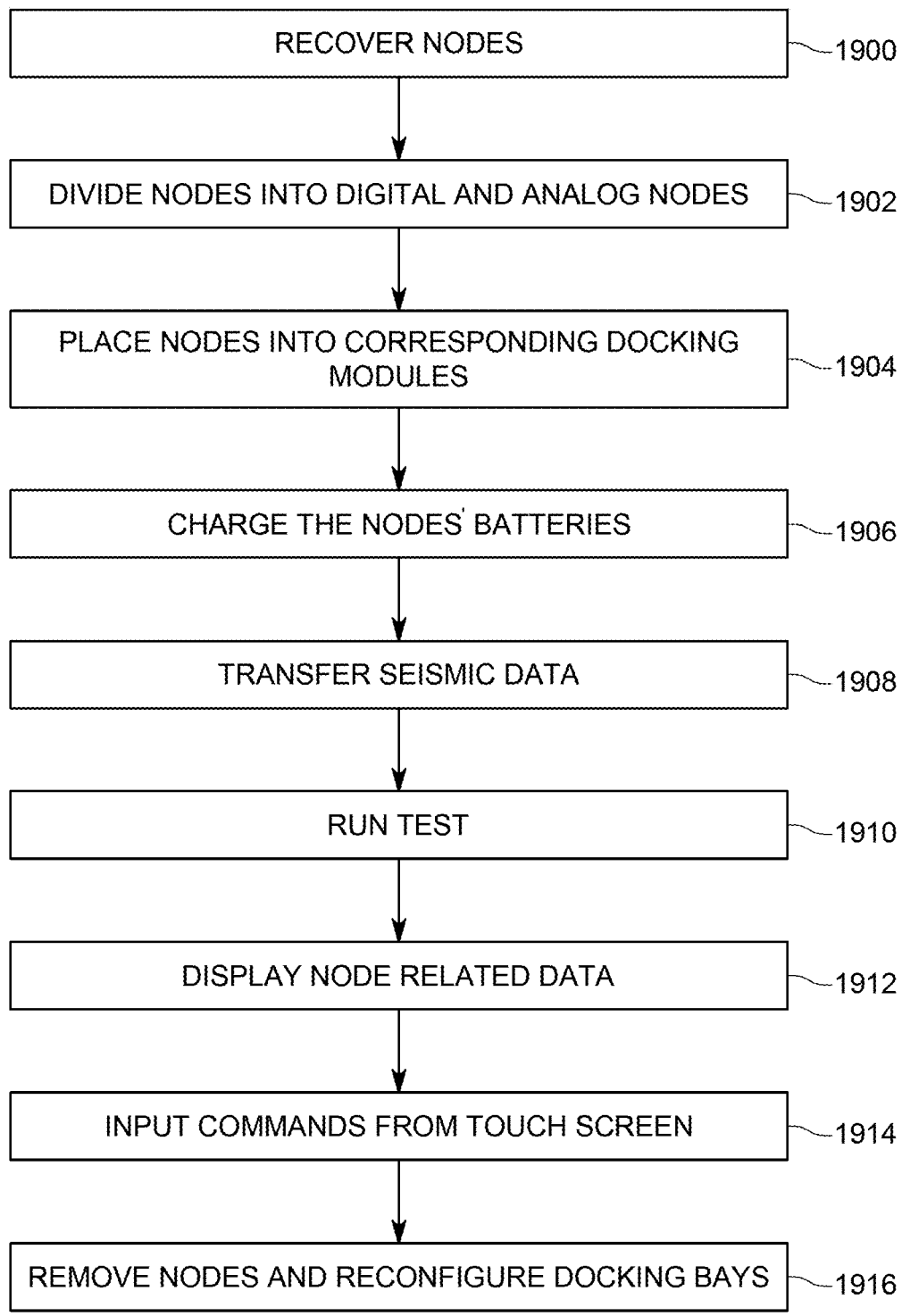
FIG. 19 is a flowchart of a method for recharging a seismic node with the docking station discussed herein.

A method for recharging a seismic node and/or transferring seismic data from the node to a server is now discussed with regard to FIG. 19. In step 1900, a set of wireless, autonomous, seismic nodes are recovered from the field after a seismic survey has been performed. In step 1902, the set of seismic nodes is divided into a first subset of digital seismic nodes 300, and a second subset of analog seismic nodes 400. In one application, the first subset is null and the second subset is equal to the set. In another application, the second subset is null and the first subset is equal to the set. In still another application, both the first and second subsets are non-zero.

In step 1904, the first subset of digital seismic nodes is placed into corresponding docking modules and the subset of analog seismic nodes is placed into other corresponding docking modules of a docking station. The digital seismic nodes and the analog seismic nodes share a same base. The digital seismic nodes have a spike attached to the base while the analog seismic nodes do not have such a spike. The spike lies outside a docking bay of the docking module while the digital seismic node is placed into its bay. In step 1906, the processor of the HCM module determines the power level of the battery of each node and starts charging the battery. In step 1908, the seismic data stored in the seismic nodes is transferred from each node, through the HCM module, to a server. In step 1910, the processor of the HCM module runs one or more software instructions for the seismic nodes. The software instructions may include test related instructions, or update instructions, or other instructions that are applied to the seismic nodes and are known in the art. In step 1912, the processor of the HCM module collects various information from the docked seismic nodes and display them and the associated information on a monitor attached to the docking station. In step 1914, the operator may interact directly with the monitor, which is a touch screen, and initiates the one or more software instructions.

In step 1916, one type of nodes are removed from the docking station and their docking bays may be reconfigured to receive another type of nodes. This step includes removing a first type of connecting ports from the docking bays and placing a second type of connecting ports into the docking bays. No other preparation steps are necessary for transforming a docking module from receiving one type of nodes to another type.

The disclosed embodiments provide a docking station that is configured to receive different types of seismic nodes for battery charging and data transfer. In particular, the current docking station can be used with the nodes as described in U.S. patent application Ser. No. 16/569,755, having the Title "Wireless seismic acquisition node and method" filed by the applicant the same day as the present application, which is incorporated herein by reference in its entirety. The docking station includes plural docking bays that can be reconfigured, by replacing a connection port, to receive either digital nodes or analog nodes. It should be understood that this description is not intended to limit the invention. On the contrary, the embodiments are intended to cover alternatives, modifications and equivalents, which are included in the spirit and scope of the invention as defined by the appended claims. Further, in the detailed description of the embodiments, numerous specific details are set forth in order to provide a comprehensive understanding of the claimed invention. However, one skilled in the art would understand that various embodiments may be practiced without such specific details.

Although the features and elements of the present embodiments are described in the embodiments in particular combinations, each feature or element can be used alone without the other features and elements of the embodiments or in various combinations with or without other features and elements disclosed herein.

This written description uses examples of the subject matter disclosed to enable any person skilled in the art to practice the same, including making and using any devices or systems and performing any incorporated methods. The patentable scope of the subject matter is defined by the claims, and may include other examples that occur to those skilled in the art. Such other examples are intended to be within the scope of the claims.

What is claimed is:

1. A docking station configured to receive different types of seismic nodes, the docking station comprising:
   a frame; and
   docking modules attached to the frame, each docking module including plural docking bays, the docking bays being configured for supplying power to and transferring seismic data from a seismic node docked therein,
   wherein at least one of the docking modules is configured to accept interchangeable ports that include digital ports and analog ports, the analog ports and the digital ports sliding out and into one of the plural docking bays.

2. The docking station of claim 1, wherein the at least one of the docking modules has one docking bay with a digital port and one docking bay with an analog port.

3. The docking station of claim 1, wherein, among the interchangeable ports, a digital port and an analog port have the same cross-section, the digital port has two pins for connecting to a digital seismic node, and the analog port has a pin and a tubular member for connecting to an analog seismic node.

4. The docking station of claim 1, wherein a docking bay among the plural docking bays of one of the docking modules includes a receptacle having a recess, and the recess is configured to successively accept a digital port and an analog port.

5. The docking station of claim 1, wherein a first docking module among the docking modules is configured with digital ports for receiving digital seismic nodes and a second docking module among the docking modules is configured with analog ports for receiving analog seismic nodes.

6. The docking station of claim 1, further comprising:
   a control module configured to control the supplying of power to and the transferring seismic data from any seismic node docked in one of the plural docking bays.

7. The docking station of claim 6, further comprising:

a monitor connected to the control module and configured to display information about at least one of the docking modules, the information being related to battery charging and/or seismic data transfer of seismic nodes docked in the plural docking bays.

8. The docking station of claim 7, wherein the monitor is a touch screen configured to receive and transfer operator commands to the control module.

9. The docking station of claim 1, wherein the control module is configured to add a docking module to the docking modules connected to supply power and to transfer data from the one or more seismic nodes docked in any of the plural docking bays thereof.

10. The docking station of claim 1, wherein the control module is configured to remove one of the docking modules connected to supply power and to transfer data.

11. A docking station configured to receive different types of seismic nodes, the docking station comprising:
docking modules, each docking module including plural docking bays;
a frame configured to receive the docking modules;
a control module configured to control supplying power to and transferring seismic data from a seismic node docked in one of the plural docking bays; and
a network connection device configured to provide data transfer capabilities for each of the plural docking bays,
wherein at least one of the docking modules is configured to accept interchangeable ports including analog ports and digital ports, the analog ports and the digital ports sliding out and in one of the plural docking bays.

12. The docking station of claim 11, wherein the at least one of the docking modules has one docking bay with a digital port and one docking bay with an analog port.

13. The docking station of claim 12, wherein the digital port and the analog port have the same cross-section, the digital port has two pins for connecting to a digital seismic node, and the analog port has a pin and a tubular member for connecting to an analog seismic node.

14. The docking station of claim 11, wherein a docking bay among the plural docking bays of one of the docking modules includes a receptacle having a recess, and the recess is configured to successively accept a digital port and an analog port.

15. The docking station of claim 11, wherein a first docking module among the docking modules has digital ports configured for receiving digital seismic nodes and a second docking module among the docking modules has analog ports configured for receiving analog seismic nodes.

16. The docking station of claim 11, wherein each of the docking module has a housing and the frame has railings configured to favor the housing sliding inside the frame.

17. The docking station of claim 11, wherein further comprising:
a monitor connected to the control module and configured to display information about the docking modules, the information being related to ongoing battery charging and/or seismic data transfer.

18. The docking station of claim 17, wherein the monitor is a touch screen configured to receive and transfer operator commands to the control module.

19. The docking station of claim 11, wherein the control module is configured to control ongoing supplying power to and transferring data to a predetermined maximum number of docking modules mounted in the frame.

20. The docking station of claim 11, wherein the control module is configured to add or remove one docking module to the docking modules so that to control supplying power to and transferring data to a current number of the docking modules mounted in the frame.

* * * * *